(12) United States Patent
Ha et al.

(10) Patent No.: US 8,303,154 B2
(45) Date of Patent: Nov. 6, 2012

(54) BACKLIGHT ASSEMBLY

(75) Inventors: Ju-Hwa Ha, Seoul (KR); Young-Ran Son, Miryang-si (KR); Joong-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 393 days.

(21) Appl. No.: 12/613,619

(22) Filed: Nov. 6, 2009

(65) Prior Publication Data
US 2010/0142188 A1 Jun. 10, 2010

(30) Foreign Application Priority Data
Dec. 4, 2008 (KR) .................. 10-2008-0122611

(51) Int. Cl.
*F21V 7/04* (2006.01)
(52) U.S. Cl. ..................... 362/619; 362/97.1
(58) Field of Classification Search .......... 362/615–617, 362/619–621, 625–626, 628, 97.1–97.3
See application file for complete search history.

(56) References Cited

U.S. PATENT DOCUMENTS

| 5,771,328 | A  * | 6/1998  | Wortman et al. ............. 385/146 |
| 2003/0184993 | A1 * | 10/2003 | Yamada .......................... 362/31 |
| 2005/0002204 | A1 * | 1/2005 | Lin et al. ...................... 362/551 |
| 2005/0270799 | A1 * | 12/2005 | Kunimochi ................. 362/610 |
| 2006/0114372 | A1 * | 6/2006 | Saito et al. ..................... 349/64 |
| 2006/0139943 | A1 * | 6/2006 | Lee et al. ....................... 362/561 |
| 2006/0238874 | A1  | 10/2006 | Yao et al. |
| 2007/0035940 | A1 * | 2/2007 | Yao et al. |
| 2007/0127265 | A1 * | 6/2007 | Onishi et al. .................. 362/614 |
| 2008/0068716 | A1 * | 3/2008 | Goto ............................. 359/599 |
| 2008/0089063 | A1  | 4/2008 | Chen |
| 2008/0285309 | A1 * | 11/2008 | Fang et al. ..................... 362/620 |

FOREIGN PATENT DOCUMENTS

| EP | 1586920 | 10/2005 |
| KR | 1020070051070 A | 5/2007 |
| KR | 1020070108795 A | 11/2007 |
| KR | 1020080046486 A | 5/2008 |
| WO | 2008/025909 | 3/2008 |
| WO | 2008/093819 | 8/2008 |

OTHER PUBLICATIONS

European Search Report—EP 09014668 dated Mar. 19, 2010.

* cited by examiner

*Primary Examiner* — Julie Shallenberger
(74) *Attorney, Agent, or Firm* — Cantor Colburn LLP

(57) ABSTRACT

A backlight assembly includes a plurality of light sources emitting light and a diffusion plate. The diffusion plate includes an incident surface on which the light is incident, an exit surface which is opposite the incident surface and from which the light exits, and first and second lens patterns which are disposed on the exit surface and have different shapes from each other. Each of the first lens patterns includes a first curved portion which forms a curve and first linear portions which extend from both ends of the first curved portion, respectively. Each of the second lens patterns includes a second curved portion which forms a curve and second linear portions which extend from both ends of the second curved portion, respectively.

12 Claims, 21 Drawing Sheets

BACKLIGHT ASSEMBLY

This application claims priority to Korean Patent Application No. 10-2008-0122611 filed on Dec. 4, 2008, and all the benefits accruing therefrom under 35 U.S.C. §119, the disclosure of which is incorporated herein by reference in its entirety.

BACKGROUND OF THE INVENTION

1. Field of the Invention

The present invention relates to a backlight assembly, and more particularly, to a backlight assembly including a diffusion plate including lens patterns which effectively diffuse light.

2. Description of the Related Art

Liquid crystal displays ("LCDs") are one of the most widely used types of flat panel displays ("FPDs"). An LCD includes a pair of display panels including electrodes, and a liquid crystal layer interposed between the display panels. In an LCD, voltages are applied to electrodes to generate an electric field. Accordingly, the alignment of liquid crystal molecules of a liquid crystal layer is determined, and polarization of incident light is controlled. As a result, desired images are displayed on the LCD.

Being non-self-luminous, LCDs require a backlight assembly, which includes light sources, i.e., light-emitting devices, in order to display images. Backlight assemblies provide light to a display panel from behind the display panel and function as a surface light source which provides uniform light to the entire surface of the display panel. Backlight assemblies are classified into direct-type backlight assemblies and edge-type backlight assemblies according to the position of light sources which generate and emit light. In direct-type backlight assemblies, light sources are disposed directly under and overlapping a display panel. In edge-type backlight assemblies, light sources are disposed under one or more sides of a display panel, and light emitted from the light sources is delivered to the display panel via a light guide plate disposed under and overlapping a display panel.

Since light sources are disposed under a diffusion plate in direct-type backlight assemblies used in conventional LCDs, bright lines can be undesirably formed. In particular, as the number of light sources is reduced, the probability of the formation of bright and dark lines increases. Furthermore, as display devices become slimmer in an overall thickness, it is required to structure the display devices to control light sources uniformly.

BRIEF SUMMARY OF THE INVENTION

Exemplary embodiments of the present invention provide a backlight assembly which has superior display quality, can reduce the thickness of a liquid crystal display ("LCD"), and, even when the number of light sources is reduced to achieve low power consumption, can secure the overall luminance uniformity of the LCD by uniformly diffusing light emitting from the light sources.

Exemplary embodiments of the present invention also provide a display device including a backlight assembly which has superior display quality, can reduce the thickness of an LCD, and, even when the number of light sources is reduced to achieve low power consumption, can secure the overall luminance uniformity of the LCD by uniformly diffusing light emitting from the light sources.

In an exemplary embodiment, there is provided a backlight assembly including a plurality of light sources emitting light and a diffusion plate including an incident surface on which the light is incident, an exit surface which is opposite the incident surface and from which the light exits, and first and second lens patterns which are disposed on the exit surface and have different shapes. Each of the first lens patterns includes a first curved portion which forms a curve and first linear portions which extend from both ends of the first curved portion, respectively, and each of the second lens patterns includes a second curved portion which forms a curve and second linear portions which extend from both ends of the second curved portion, respectively.

In an exemplary embodiment, there is provided a backlight assembly including a plurality of light sources emitting light and a diffusion plate including an incident surface on which the light is incident, an exit surface which is opposite the incident surface and from which the light exits, and first through third lens patterns which are sequentially repeated on the exit surface. The first lens patterns overlap the light sources, and the second and third lens patterns have different shapes and are symmetrical to each other about a boundary therebetween.

In an exemplary embodiment, there is provided a backlight assembly including a plurality of light sources emitting light and a diffusion plate including an incident surface on which the light is incident, an exit surface which is opposite the incident surface and from which the light exits, and lens patterns which are composed of curved portions disposed on the exit surface. Light diffusion patterns are formed in an upper end of each of the curved portions.

In an exemplary embodiment, there is provided a display device including a plurality of light sources emitting light a display panel receiving the light from the light sources and displaying image information and a diffusion plate including an incident surface on which the light is incident, an exit surface which is opposite the incident surface and from which the light exits, and first and second lens patterns which are disposed on the exit surface and have different shapes. Each of the first lens patterns includes a first curved portion which forms a curve and first linear portions which extend from both ends of the first curved portion, respectively, and each of the second lens patterns includes a second curved portion which forms a curve and second linear portions which extend from both ends of the second curved portion, respectively.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
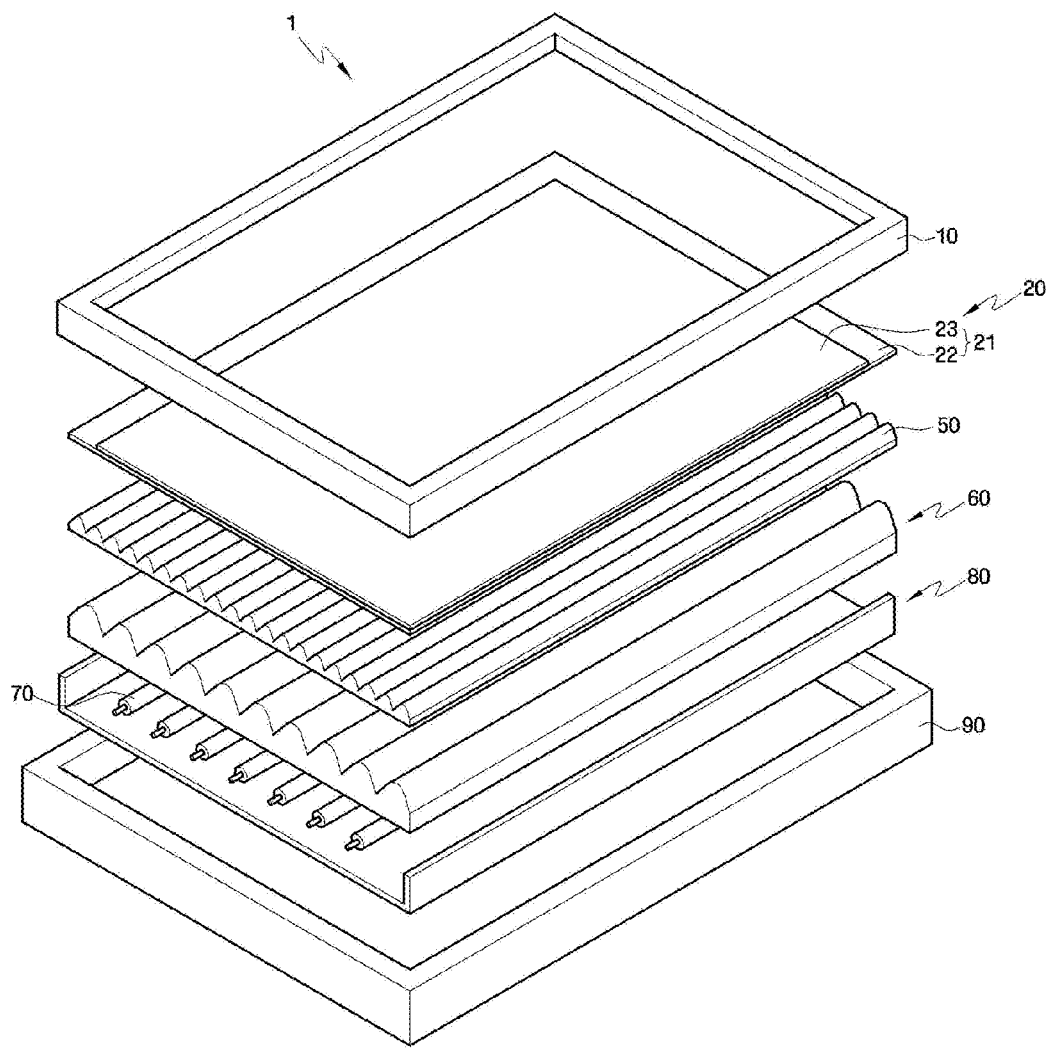
FIG. 1 is an exploded perspective view of an exemplary embodiment of a display device including a backlight assembly according to the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. In the drawings, lengths and sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to (plan and) cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a backlight assembly according to exemplary embodiments of the present invention will be described in detail with reference to the attached drawings.

Figure 2:
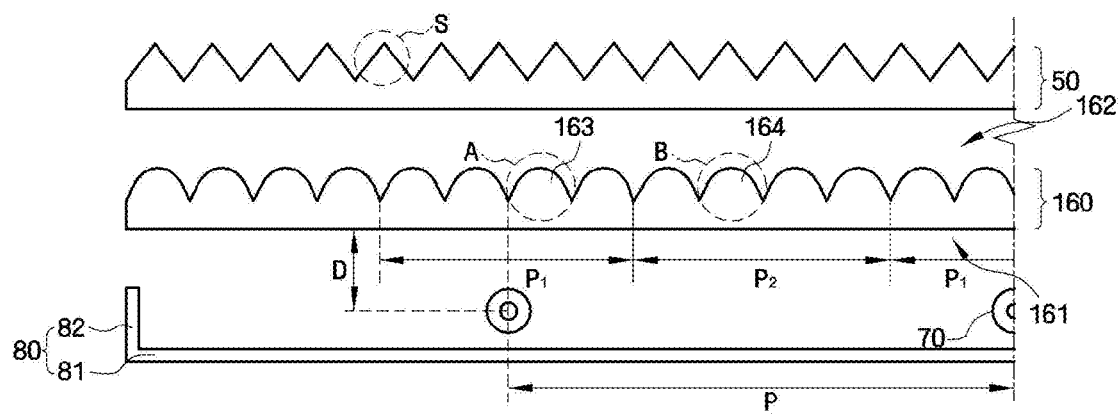
FIG. 2 is a schematic cross-sectional view of a first exemplary embodiment of a backlight assembly included in the display device of FIG. 1.
Figure 3A:
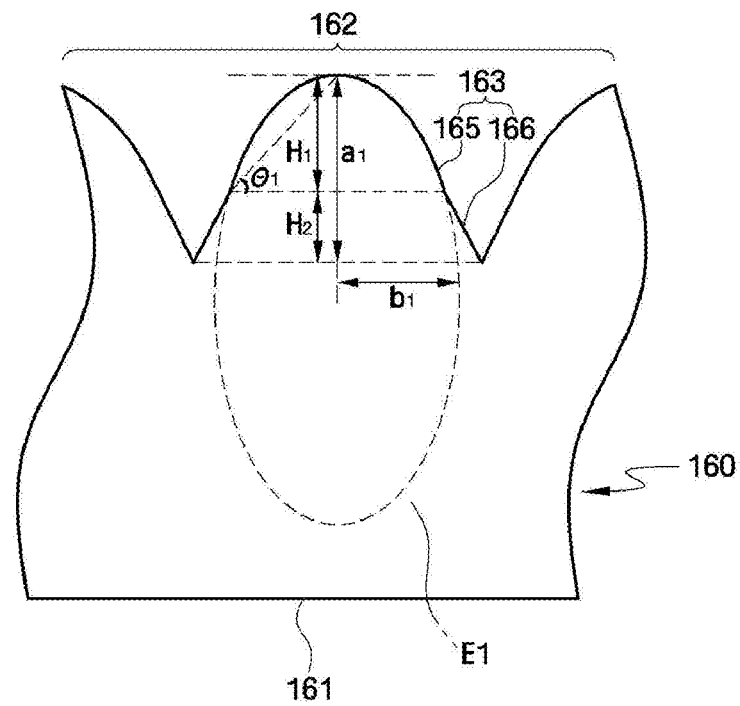
FIGS. 3A and 3B are enlarged cross-sectional views of exemplary embodiments of a first lens pattern in a region A and a second lens pattern in a region B shown in FIG. 2, respectively.
Figure 3B:
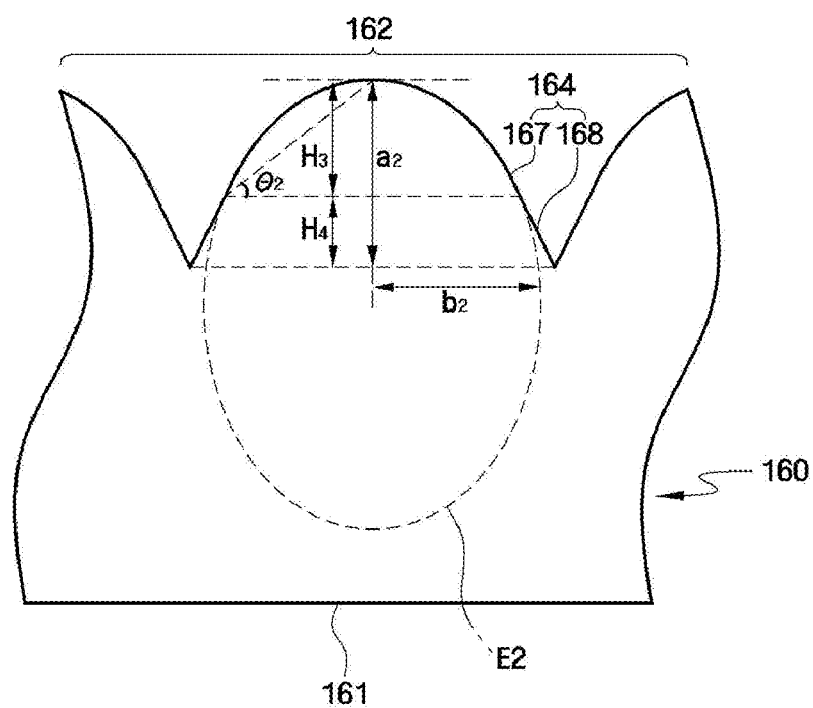
Figure 4A:
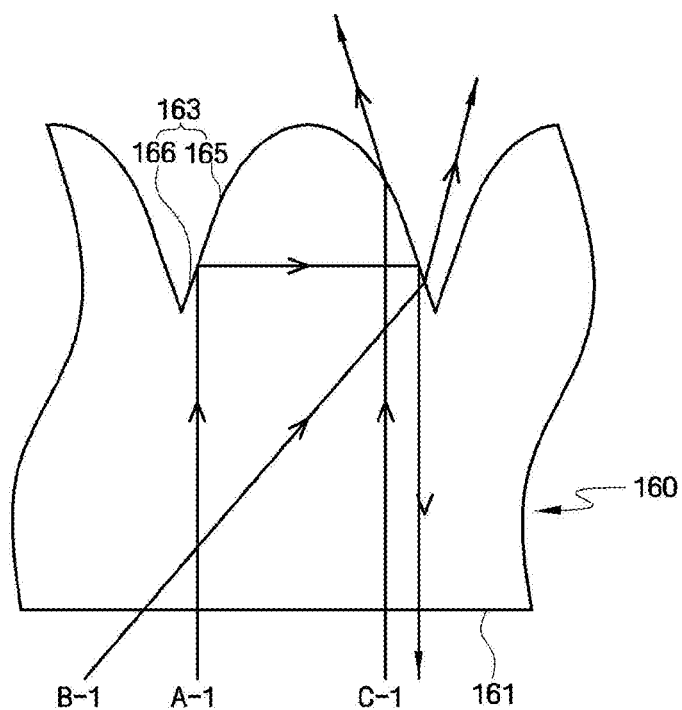
FIG. 4A is a cross-sectional view showing an exemplary embodiment of paths of light incident on the first lens pattern of FIG. 3A.
Figure 4B:
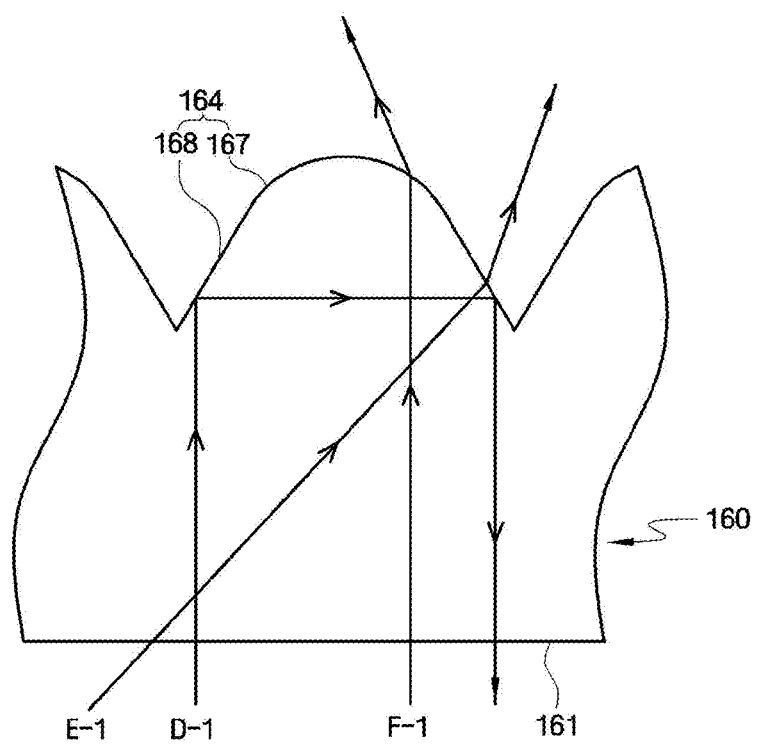
FIG. 4B is a cross-sectional view showing an exemplary embodiment of paths of light incident on the second lens pattern of FIG. 3B.
Figure 5:
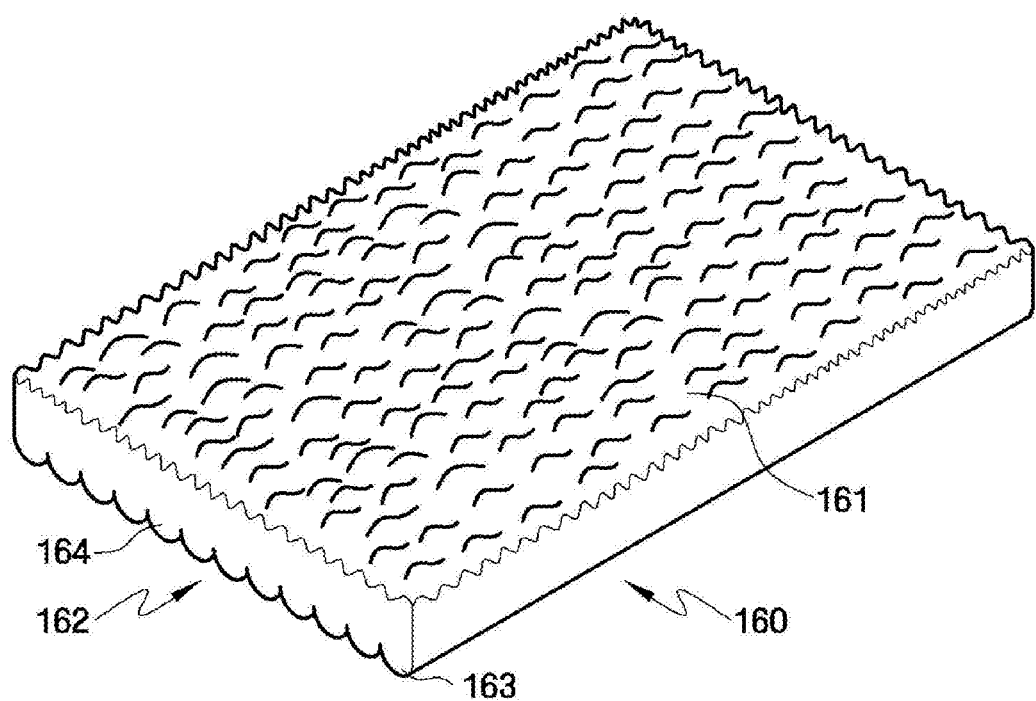
FIG. 5 is a rear perspective view of an exemplary embodiment of a diffusion plate included in the display device of FIG. 1.
Figure 6:
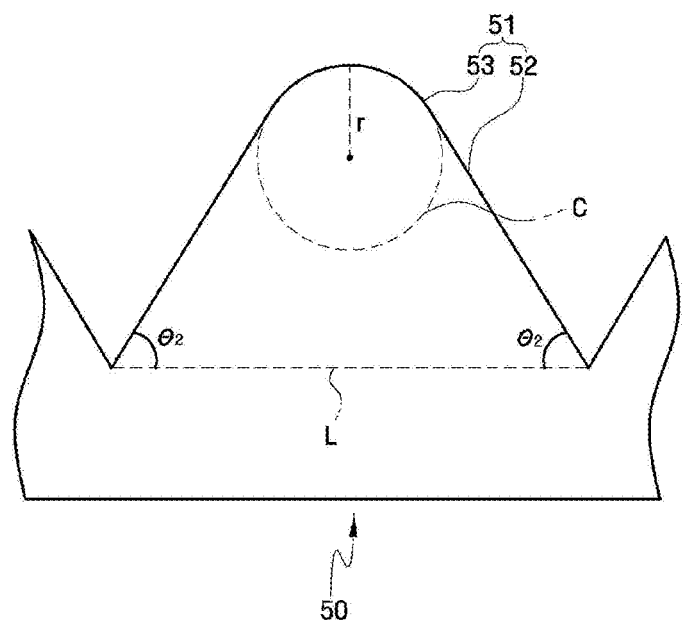
FIG. 6 is an enlarged cross-sectional view of an exemplary embodiment of a prism pattern in a region S of an optical sheet shown in FIG. 2.

A backlight assembly according to a first embodiment of the present invention will now be described in detail with reference to FIGS. 1 through 6. FIG. 1 is an exploded perspective view of an exemplary embodiment of a display device 1 including a backlight assembly. FIG. 2 is a schematic cross-sectional view of the backlight assembly included in the display device 1 of FIG. 1. FIGS. 3A and 3B are enlarged cross-sectional views of an exemplary embodiment a first lens pattern 163 in a region A and a second lens pattern 164 in a region B shown in FIG. 2, respectively. FIG. 4A is a cross-sectional view showing an exemplary embodiment of paths of light incident on the first lens pattern 163 of FIG. 3A. FIG. 4B is a cross-sectional view showing an exemplary embodiment of paths of light incident on the second lens pattern 164 of FIG. 3B. FIG. 5 is a rear perspective view of an exemplary embodiment of a diffusion plate 160 included in the display device 1 of FIG. 1. FIG. 6 is an enlarged cross-sectional view of an exemplary embodiment of a prism pattern 51 in a region S of an optical sheet 50 shown in FIG. 2.

Referring to FIG. 1, the display device 1 including the backlight assembly includes a display panel assembly 20, an upper housing 10, an optical sheet 50, a diffusion plate 60, a plurality of a light source 70, a reflective sheet 80, and a lower housing 90.

The display panel assembly 20 includes a display panel 21 which includes a lower substrate 22, an upper substrate 23, and a liquid crystal layer (not shown) interposed between the lower and upper substrates 22 and 23.

The display panel 21 includes the lower substrate 22, on which gate lines (not shown), data lines (not shown) and a thin-film transistor ("TFT") array are disposed. The display panel 21 further includes the upper substrate 23 on which a black matrix and a common electrode are disposed, and which faces the lower substrate 22. The display panel 21 structured as described above receives light generated and emitted from the light sources 70, and displays image information.

The upper housing 10 forms a portion of an exterior of the display device 1 and includes a space to accommodate the display panel assembly 20 therein. The upper housing 10 may define the uppermost surface of the display device 1, at a viewing side of the display device 1. In addition, an open window is disposed substantially in a center of an upper surface of the upper housing 10, to expose a portion of the display panel 21. The upper housing 10 is coupled to the lower housing 90 which may define the rearmost surface of the display device 1. Each of the upper housing 10 and the lower housing 90 may include sidewalls extending from the upper surface of the upper housing 10 and a lower (e.g., bottom) surface of the lower housing 90, respectively.

The diffusion plate 60 diffuses light, which is generated and emitted from the light sources 70, in substantially all directions. The diffusion plate 60 reduces or effectively prevents bright lines, which are formed substantially similar to a shape of the light sources 70, from being seen from a front (e.g., viewing side) of the display device 1. The diffusion plate 60 is interposed between the display panel 21 and the light sources 70.

Referring to FIG. 2, the backlight assembly of the illustrated first embodiment includes the optical sheet 50, a diffusion plate 160, and the reflective sheet 80. Referring to FIGS. 3A through 4B, the diffusion plate 160 includes an incident surface 161 on which light from the light sources 70 is incident, and an exit surface 162 which is opposite the incident surface 161 with respect to a body of the diffusion plate 160 and from which the incident light exits after traveling through the diffusion plate 160.

In order to effectively diffuse light from the incident surface 161, lens patterns are disposed on the exit surface 162 of the diffusion plate 160. The lens patterns effectively diffuse and output light which is input to the diffusion plate 160. The lens patterns of the first embodiment of the backlight assembly are configured as follows.

Referring to FIGS. 2A through 4B, first and second lens patterns 163 and 164 having different shapes are disposed on the exit surface 162 of the diffusion plate 160. The first and second lens patterns 163 and 164 may longitudinally extend in a lengthwise (first) direction of the light sources 70 (see FIG. 1) and substantially parallel to the lengthwise direction of the light sources 70. The first and second lens patterns 163 and 164 are arranged in a transverse (second) direction of the light sources 70, such as substantially perpendicular or inclined to the first direction.

The first and second lens patterns 163 and 164 are alternately arranged with each other across the diffusion plate 160. In the illustrated embodiment, the first lens patterns 163 are disposed in each first section of the diffusion plate 160, which is as wide as each second section of the diffusion plate 160 in which the second lens patterns 164 are disposed.

The first section of the diffusion plate 160 may include a first plurality or a first group of a first lens pattern 163, and the second section of the diffusion plate 160 may include a second plurality or a second group of the second lens pattern 164. The first and second groups of respective lens patterns are alternated with each other along the transverse direction.

A center portion of a width $P_1$ taken in the transverse direction of each section in which the first lens patterns 163 are disposed, may overlap a single one of the light sources 70 disposed thereunder. In the illustrated exemplary embodiment, the first and second lens patterns 163 and 164 may be disposed on the diffusion plate 160 as follows. When a pitch (e.g., distance) between every two neighboring ones of the light sources 70 is "$P_1$" the width $P_1$ of each section in which the first lens patterns 163 are disposed may be P/2. In addition, a width $P_2$ taken in the transverse direction of each section in which the second lens patterns 164 are disposed may be P/2, such as being substantially equal to the width $P_1$ of each section in which the first lens patterns 163 are disposed. Each section in which the first lens patterns 163 are disposed may alternate with each section in which the second lens patterns 164 are disposed, wherein each of the above sections has a width of P/2. In the illustrated embodiment, each of the plurality of the light source 70 may be overlapped by the center of the width $P_1$ of each section in which the first lens patterns 163 are disposed.

The diffusion plate 160 may include at least one of acrylic resin, styrene resin, methyl methacrylate-styrene copolymer resin, polycarbonate resin, and olefin resin. In exemplary embodiments, the diffusion plate 160 may be made of any one of polycarbonate ("PC"), polystyrene resin ("PS"), polyethyleneterephthalate ("PET"), polyarylate ("PAR"), polysulfone resin ("PSU"), polyehtersulfone resin ("PES"), polypropylene ("PP"), polyamide ("PA"), polyphenylene sulfide ("PPS"), polyimide resin ("PI"), polyether-ether-ketone ("PPEK"), polyurethane resin ("PUR"), polybinyl chloride ("PVC"), metylpentene polymer ("PMP"), polymethacrylate ("PMMA"), silicon resin ("SI"), acrylic resin, and fluorine resin.

The first and second lens patterns 163 and 164 will be described in more detail with reference to FIGS. 3A and 3B.

Referring to FIG. 3A, each of the first lens patterns 163 includes a first curved portion 165 and a plurality of a first linear portion 166 which each extend from both of opposing ends of the first curved portion 165, respectively. The first linear portions 166 are disposed directly adjacent to the first curved portion 165, and are disposed continuous with the first curved portion 165.

The first curved portion 165 partially reflects and partially diffuses light which is received through the incident surface 161 of the diffusion plate 160. Each of the first linear portions 166 refracts a portion of light, which is received through the incident surface 161, to adjust the direction of the light and substantially totally reflects part of the light.

In order to properly perform the above functions, the first curved portion 165 and the first linear portions 166 of each of the first lens patterns 163 may be configured to satisfy the following requirements.

The first curved portion 165 of each of the first lens patterns 163 may be shaped like an end of an oval. A virtual isosceles triangle may be inscribed in the first curved portion 165, which is an end of an oval, and include two vertexes that contact the first linear portions 166, respectively. A base angle $\theta1$ of the virtual isosceles triangle may be about 50 degrees to about 52 degrees. When a length of the first lens pattern 163 along a long axis of the oval, an end of which forms the first curved portion 165, is a1 and when a length of a short axis of the oval is b1 at the length a1, a ratio (a1/b1) of the length a1 of the long axis to the length b1 of the short axis may be configured to be about 2.4 to about 3.5.

In addition, a height H1 taken in a third direction along the long axis of the oval and substantially perpendicular to the diffusion plate 160, of the first curved portion 165 is configured to be a distance between a vertex of the virtual isosceles triangle, which contacts a top end of the first curved portion 165, and a bottom (e.g., base) side of the virtual isosceles triangle. A height H2 taken in the third direction along the long axis of the oval and substantially perpendicular to the diffusion plate 160, of each of the first linear portions 166 is configured to be a distance between the bottom side of the virtual isosceles triangle and a virtual line which is substantially parallel to the incident surface 161 and connects respective ends of the first linear portions 166. In the illustrated embodiment, the height H1 of the first curved portion 165 and the height H2 of each of the first linear portions 166 may satisfy $0.12*H1<H2<1.25*H1$.

Referring to FIG. 3B, each of the second lens patterns 164 includes a second curved portion 167 and a plurality of a second linear portion 168 each of which extend from both of opposing ends of the second curved portion 167, respectively. The second linear portions 168 are disposed directly adjacent to the second curved portion 167, and are disposed continuous with the first curved portion 165.

Since the functions of the second curved portion 167 and the second linear portions 168 of each of the second lens patterns 164 are essentially identical to those of the first curved portion 165 and the first linear portions 166, a description thereof will not be repeated.

In order to properly perform the above-described functions, the second curved portion 167 and the second linear portions 168 of each of the second lens patterns 164 may be configured to satisfy the following requirements.

The second curved portion 167 of each of the second lens patterns 164 may be shaped like an end of an oval. A virtual isosceles triangle may be inscribed in the second curved portion 167, which is an end of an oval, and include two vertexes that contact the second linear portions 168, respectively. A base angle $\theta2$ of the virtual isosceles triangle may be about 42 to about 49 degrees. When a length of the second lens pattern 164 a long axis of the oval, an end of which forms the second curved portion 167, is a2 and when a length of a short axis of the oval is b2 at the length a2, a ratio (a2/b2) of the length a2 of the long axis to the length b2 of the short axis may be configured to be about 2.4 to about 3.5.

In addition, a height H3 taken in the third direction along the long axis of the oval and substantially perpendicular to the diffusion plate 160 of the second curved portion 167 is configured to be a distance between a vertex of the virtual isosceles triangle, which contacts a top end of the second curved portion 167, and a bottom (e.g., base) side of the virtual isosceles triangle. A height H4 taken in the third direction along the long axis of the oval and substantially perpendicular to the diffusion plate 160 of each of the second linear portions 168 is configured to be a distance between the bottom side of the virtual isosceles triangle and a virtual line which is substantially parallel to the incident surface 161 and connects respective ends of the second linear portions 168. In the illustrated embodiment, the height H3 of the second curved portion 167 and the height H4 of each of the second linear portions 168 may satisfy $0.9*H3<H4<1.1*H3$.

As described above, when each of the first and second curved portions 165 and 167 is shaped like an end of an oval, a ratio of the length a1 or a2 of the first and second curved portions 165 and 167, respectively, taken along the long axis of the oval, to the length b1 or b2 of the short axis thereof may be configured to about 2.4 to about 3.5. In the illustrated embodiment, the difference between the ratio (a1/b1) of the length a1 of the long axis to the length b1 of the short axis of the first lens pattern 163, and the ratio (a2/b2) of the length a2 of the long axis to the length b2 of the short axis of the second lens pattern 164, may be configured to be about 0.01 to about 0.3.

The light diffusion function of each of the first and second curved portions 165 and 167 may be controlled according to the relative position thereof along the transverse direction with respect to the light sources 70. Referring to FIG. 2, the first curved portion 165 of the first lens pattern 163 is located relatively close to the light sources 70, and the second curved portion 167 of the second lens pattern 164 is located relatively farther from the light sources 70 in comparison to the first lens pattern 163. Consequently, the luminance uniformity of light that passes through the diffusion plate 160 can be advantageously controlled.

The first and second linear portions 166 and 168 are substantially linear sides which have slopes. A slope of the first linear portions 166 may be defined by an angle between a first linear portion 166 and a virtual line disposed substantially parallel to the incident surface 161 connecting distal ends of the second linear portions 166. A slope of the second linear portions 168 may be defined by an angle between a second linear portion 168 and a virtual line disposed substantially parallel to the incident surface 161 connecting distal ends of the second linear portions 168.

A ratio of the slope of each of the first linear portions 166 to the slope of each of the second linear portions 168 may be in the range of about 1 to about 1.5. Since the center of the width P1 of each section in which the first lens patterns 163 are disposed overlaps a corresponding (e.g., nearest) one of the light sources 70, each section P1 in which the first lens patterns 163 are disposed is located relatively closer to the corresponding one of the light sources 70, than each section P2 in which the second lens patterns 164 are disposed. Accordingly, more light is vertically incident on the first lens patterns 163 than on the second lens patterns 164. In contrast, more light is obliquely incident on the second lens patterns 164 than on the first lens patterns 163. For this reason, the luminance of each section P1 in which the first lens patterns 163 are disposed may be different from that of each section P2 in which the second lens patterns 164 are disposed.

The virtual line connecting respective distal ends of the first linear portions 166 and the distal ends of the second linear portions 168 define a base of the first lens pattern 163 and the second lens pattern 164, respectively. Bases of the first lens pattern 163 and the second lens pattern 164 are disposed substantially coplanar with each other, and the first lens pattern 163 and the second lens pattern 164 are disposed directly adjacent to each other on the exit surface 162 of the diffusion plate 160.

In order to not make the luminance of section P1 substantially different from that of section P2, it is required to essentially prevent all light, which is substantially vertically incident on the first lens patterns 163 from the light sources 70, from relatively easily passing through the first lens patterns 163 and exiting the diffusion plate 160. To this end, a portion of light, which is substantially vertically incident on the first lens patterns 163 from the light sources 70, may be totally reflected.

In addition, it is required to control light, which is obliquely incident on the second lens patterns 164, to pass through the second lens patterns 164 and then be concentrated on the display panel 21 (see FIG. 1) directly above the diffusion plate 160. To this end, the second linear portions 168 are configured to be relatively longer than the first linear portions 166. Referring to FIGS. 3A and 3B, a distance between the distal ends of the second linear portions 168 is larger than a distance between the distal ends of the first linear portions 166. Since more light is obliquely incident on the second lens patterns 164 than on the first lens patterns 163, if the second linear portions 168 are relatively longer than the first linear portions 166, more of the light which is obliquely incident on the second lens patterns 164, can be concentrated on the display panel 21 disposed directly above the diffusion plate 160, by the second linear portions 168.

To further make the luminance of section P1 not substantially different from that of section P2, the ratio of the slope of each of the first linear portions 166 of each of the first lens patterns 163, to the slope of each of the second linear portions 168 of each of the second lens patterns 164 can be configured to be within a predetermined range. Since the slope of each of the second linear portions 168 is relatively smaller than that of each of the first linear portions 166, more of the light, which is obliquely incident, can pass through the second linear portions 168. Accordingly, more of the light, which is incident on the second lens patterns 164, can be concentrated on the display panel 21 disposed directly above the diffusion plate 160.

FIGS. 4A and 4B show exemplary embodiments of paths of light incident on the incident surface 161 of each of the first and second lens patterns 163 and 164, respectively. Referring to FIG. 4A, light incident on the incident surface 161 of each of the first lens patterns 163 may travel in a path A-1 in which it is totally reflected at one of the first linear portions 166, a path B-1 in which it passes through one of the first linear portions 166, and a path C-1 in which it passes through the first curved portion 165.

In the path A-1, light is substantially vertically incident upon the incident surface 161 and travels toward a corresponding one of the first linear portions 166. The light is substantially totally reflected at the corresponding one of the first linear portions 166 and directed toward the other one of the first linear portions 166. The light is totally reflected at the other one of the first linear portions 166, and then exits through the incident surface 161 of the diffusion plate 160. The light substantially vertically incident on one of the first linear portions 166 fails to pass through the diffusion plate 160 and exits downward.

In the path B-1, light is obliquely incident on the incident surface 161 and travels toward a corresponding one of the first linear portions 166. Most of the light passes through the corresponding one of the first linear portions 166, while a portion of the light is reflected at the corresponding one of the first linear portions 166. Since a refractive index of the diffusion plate 160 is generally greater than that of air, light which passed through the corresponding one of the first linear portions 166 is refracted toward above the diffusion plate 160. As the difference between the refractive index of the diffusion plate 160 and that of air increases, a refraction angle of the light may be increased. In this way, light, which obliquely enters each of the first linear portions 166 of the diffusion plate 160, can be concentrated onto the display panel 21 (see FIG. 1) as it passes through each of the first lens patterns 163.

In the path C-1, light is incident on the incident surface 161 and travels toward the first curved portion 165. The light passes through the first curved portion 165 and exits the diffusion plate 160 through the exit surface 162. Since the first curved portion 165 forms an end of an oval, a tangent line to a surface of the first curved portion 165, through which light passes, varies. Accordingly, light that passes through the first curved portion 165 may be refracted at various angles and, when passed through the first curved portion 165, may be diffused in various directions. In addition, since the refractive index of the diffusion plate 160 is greater than that of air, light that passed through the first curved portion 165 is refracted toward above the diffusion plate 160.

In the path C-1, a portion of light, which enters the diffusion plate 160, may be reflected at the first curved portion 165. However, most of the light passes through the first curved portion 165 and is diffused in various directions as it exits from the diffusion plate 160. Furthermore, due to the difference between the refractive index of the diffusion plate 160 and that of air, the diffused light proceeds toward above the diffusion plate 160 and is concentrated onto the display panel 21 which disposed overlapping the diffusion plate 160 (see FIG. 1).

Referring to FIG. 4B, light incident on the incident surface 161 of each of the second lens patterns 164 may travel in paths D-1, E-1, and F-1. The paths D-1, E-1, and F-1 correspond to the paths A-1, B-1, and C-1, respectively, of FIG. 4A. Therefore, the paths D-1, E-1, and F-1 will not be further described. It is noted that more light is obliquely incident on the second lens patterns 164 along the path E-1 rather than vertically incident thereon along the path D-1 or F-1, due to the position of each section $P_2$, in which the second lens patterns 164 are including, with respect to the light sources 70. Accordingly, more light may pass through the second linear portions 168 and then be concentrated toward the display panel 21, instead of being substantially totally reflected by the second linear portions 168.

Referring to FIG. 2, a distance in the third direction between the light sources 70 and the diffusion plate 160 is "D." In the illustrated embodiment, when a pitch between every pair of two neighboring ones of the light sources 70 is "P," $0.3 < D/(P/2) < 0.5$. Advantageously, the display device can be designed by using a minimum number of light sources required and controlling an overall thickness of the backlight assembly.

An exemplary embodiment of the display device 1 may be configured as follows. The pitch P between every two neighboring ones of the light sources 70 may be controlled to achieve minimum luminance required for a product with relatively low power consumption, and then, the distance D between the light sources 70 and the diffusion plate 160, which can affect the overall thickness of the backlight assembly, may be controlled so as to use a minimum number of light sources required while minimizing an overall thickness of the backlight assembly. Conversely, the distance D between the light sources 70 and the diffusion plate 160 may be controlled, and then the pitch P between every two neighboring ones of the light sources 70 may be controlled, so as to use a minimum number of light sources required while minimizing an overall thickness of the backlight assembly.

The shape of the incident surface 161 of the diffusion plate 160 will now be described with reference to FIG. 5. Referring to FIG. 5, a rear surface of the diffusion plate 160 is the incident surface 161. The incident surface 161 may include a scattered refraction surface. The scattered refraction surface denotes a surface which scatters and refracts incident light in random directions. The scattered refraction surface may include an irregular curved surface, particles disposed on the incident surface 161 or disposed within the diffusion plate 160, or openings. When the incident surface 161 is the scattered refraction surface, formation of moiré patterns can be reduced or effectively prevented on the display panel 21 (see FIG. 1) due to the interference of light which may be caused by regular shapes or patterns of the diffusion plate 160. The incident surface 161 may not necessarily have moiré patterns. Alternatively, the incident surface 161 may also include irregular, uneven patterns according to embodiments of the present invention. In one exemplary embodiment, the incident surface 161 of the diffusion plate 160 may have a roughness of about 4 micrometers (μm) to about 10 micrometers (μm).

Referring to FIGS. 1, 2 and 6, the optical sheet 50 is interposed between the diffusion plate 160 and the display panel 21. The optical sheet 50 concentrates light from the diffusion plate 160 onto the display panel 21. The optical sheet 50 overlaps the diffusion plate 160, in a layout view of the display device 1.

A plurality of a prism pattern 51 (see FIG. 6 and the region S of FIG. 2) is disposed on a top surface of the optical sheet 50 facing the display panel 21. The prism patterns 51 longitudinally extend substantially parallel to the lengthwise (first) direction of the light sources 70. The prism patterns 51 are arranged in the transverse (second) direction of the light sources 70, such as substantially perpendicular or inclined to the first direction.

A prism curved portion (e.g. distal end) 53 of each of the prism patterns 51 may be shaped like an end of a virtual circle "C" to diffuse and output light which is incident on the optical sheet 50. The virtual circle "C" may have a radius "r" of about 5 μm to about 10 μm. Advantageously, the overall luminance uniformity of the display device can be secured. A prism linear portion 52 is disposed directly adjacent to each distal end of the "C" shape of the prism curved portion 53, and is disposed continuous with the prism curved portion 53. A length "L" is defined between distal ends of the prism linear portions 52, and is taken at the bottom (e.g., base) of the prism pattern 51. A slope of the prism linear portions 52 may be defined by an angle θ2 between the prism linear portion 52 and a virtual line disposed substantially parallel to a lower surface of the optical sheet 50 connecting the distal ends of the prism linear portions 52, such as indicated as the length "L."

The prism patterns 51 disposed on the optical sheet 50 may longitudinally extend in the same direction as each of the first and second lens patterns 163 and 164 disposed on the diffusion plate 160.

In the third direction substantially perpendicular to the diffusion plate 160, a thickness of the optical sheet 50 may be smaller than a thickness of the diffusion plate 160. Since the diffusion plate 160 can essentially fully function as a support to other elements of the display device 1, the optical sheet 50 may be made of a flexible material.

The light sources 70, which emit light, are disposed under the diffusion plate 160 and are disposed overlapping the incident surface 161 of the diffusion plate 160. The light sources 70 generate light and provide the generated light to the display panel 21. The light sources 70 may include, but are not limited to, a plurality of a line light source, such as a cold cathode fluorescent lamp ("CCFL") or a hot cathode fluorescent lamp ("HCFL"), or a plurality of a point light source, such as a light-emitting diode ("LED").

The reflective sheet 80 is disposed under and overlapping the light sources 70 in the layout view, and reflects light, which is initially emitted downward from the light sources 70, upward to enhance light efficiency. The reflective sheet 80 includes a bottom portion 81 which is disposed under and overlapping the light sources 70, and a pair of bent portions 82 which extend upward from the bottom portion 81 and are disposed on both of opposing longitudinal outer sides of the plurality of the light sources 70. The bent portions 82 and the bottom portion 81 form a single, continuous and indivisible member of the reflective sheet 80.

The bottom portion 81 is disposed under the light sources 70 and reflects light, which is emitted downward from the light sources 70, upward towards the diffusion plate 160. The bent portions 82 extend upward from the bottom portion 81 along more than one side of the lower housing 90. Since the sidewall portions 82 are disposed on both of opposing outer sides of the light sources 70, they reflect light laterally emitted from the light sources 70.

Hereinafter, a backlight assembly according to a second exemplary embodiment of the present invention will be described in detail with reference to FIGS. 1 and 7 through 9B. For simplicity, elements having the same functions as those illustrated in the drawings for the first embodiment are indicated by like reference numerals, and thus their description will be omitted.

Figure 7:
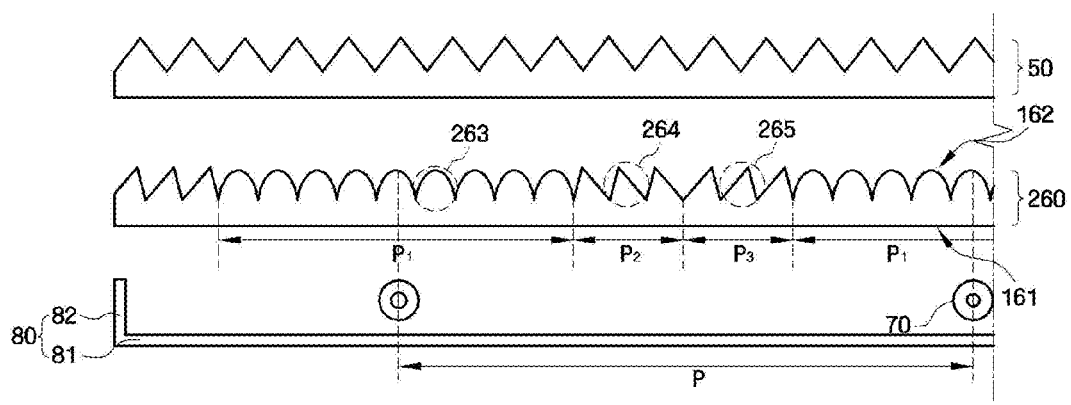
FIG. 7 is a schematic cross-sectional view of a second exemplary embodiment of a backlight assembly included in the display device of FIG. 1.

FIG. 7 is a schematic cross-sectional view of the backlight assembly, which is included in the display device 1 of FIG. 1.

Referring to FIG. 7, the backlight assembly includes a diffusion plate 260 and an optical sheet 50. The diffusion plate 260 includes an incident surface 161 upon which light emitted from a plurality of light sources 70 is incident, an exit surface 162 which is opposite the incident surface 161 with respect to a body of the diffusion plate 260 and from which light exits, and first through third lens patterns 263 through 265, of which groups thereof are sequentially repeated on the exit surface 162. In addition, the optical sheet 50 includes a plurality of a prism pattern disposed on a top surface thereof and overlaps the diffusion plate 260 in the layout view of the display device 1.

The first lens patterns 263 overlap the light sources 70. In addition, the second and third lens patterns 264 and 265 each have different shapes, and are symmetrical to each other about a boundary therebetween. As illustrated in FIG. 7, the group of second lens patterns 264 are inclined towards the left, while the group of third lens patterns 265 are inclined towards the right, the second and third lens patterns 264 and 265 being symmetrical about the boundary between the two groups of lens patterns.

The first through third lens patterns 263 through 265 are alternately arranged on the exit surface 162 of the diffusion plate 260. The first through third lens patterns 263 through 265 are disposed in first to third sections having predetermined widths, respectively. A width of each section in which the second or third lens patterns 264 or 265 are disposed may be smaller than a width of a section in which the first lens patterns 263 are disposed. A first section of the diffusion plate 260 may include a first plurality or a first group of the first lens pattern 263, a second section of the diffusion plate 260 may include a second plurality or a second group of the second lens pattern 264, and a third section of the diffusion plate 260 may include a third plurality or a third group of the third lens pattern 265. The first, second and third groups of respective lens patterns are alternated with each other along the transverse direction of the diffusion plate 260.

In the illustrated embodiment, when a pitch (e.g., distance) between every two neighboring ones of the light sources 70 is "P," a width $P_1$ of each section in which the first lens patterns 263 are disposed may be 5P/7. In addition, a width $P_2$ or $P_3$ taken n the transverse direction of each section in which the second or third lens patterns 264 or 265 are disposed may be P/7. However, the widths $P_1$ through $P_3$ of the sections, in which the first through third lens patterns 263 through 265 are disposed, respectively, are not limited to the illustrated embodiment. Alternatively, the first through third lens patterns 263 through 265 can be disposed in sections having various combinations of widths.

Figure 8A:
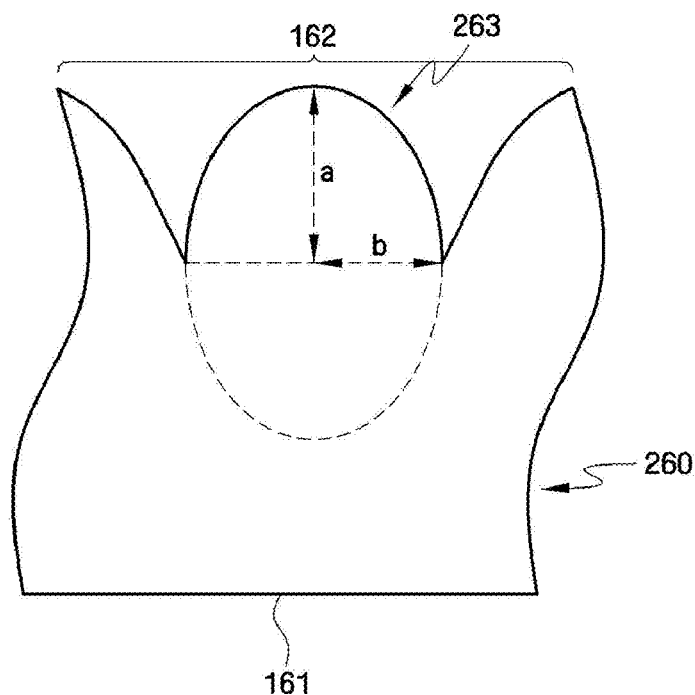
FIGS. 8A through 8C are cross-sectional views of exemplary embodiments of first through third lens patterns of the second embodiment, respectively.

FIG. 8A is a cross-sectional view of an exemplary embodiment of one of the first lens patterns 263. Referring to FIGS. 7 and 8A, each of the first lens patterns 263 is shaped like an end of an oval. Each of the first lens patterns 263 reflects or diffuses light received through the incident surface 161 of the diffusion plate 260. Each of the first lens patterns 263 effectively diffuses light, which is generated and emitted from the light sources 70 thereunder, and concentrates the light on the display panel 21. Advantageously, the luminance uniformity of the display device can be secured.

A length of the first lens pattern 263 along a long axis of the oval is indicated by "a" and a length of a short axis of the oval is indicated as "b".

Figure 8B:
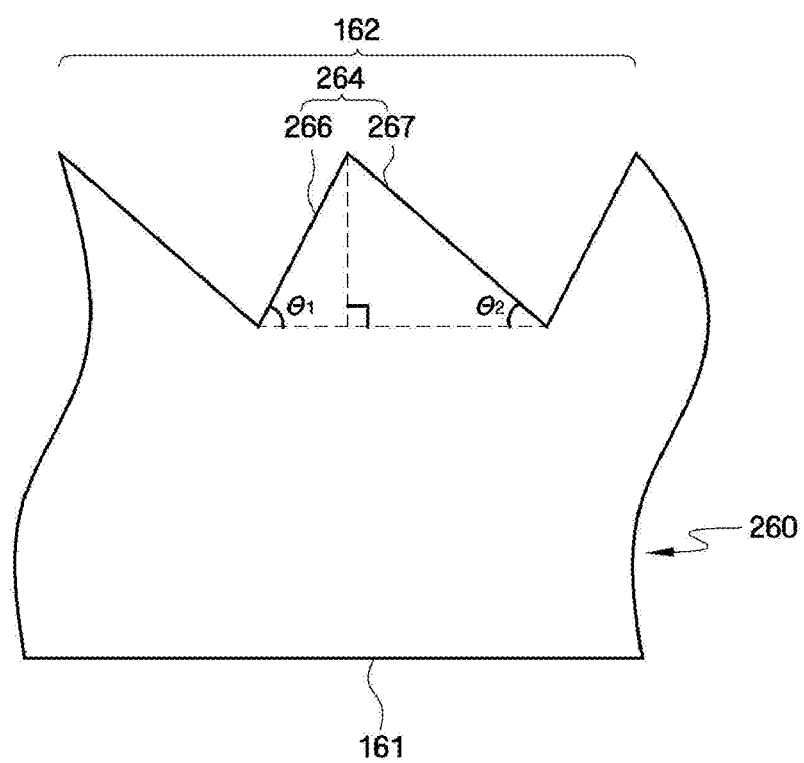
Figure 8C:
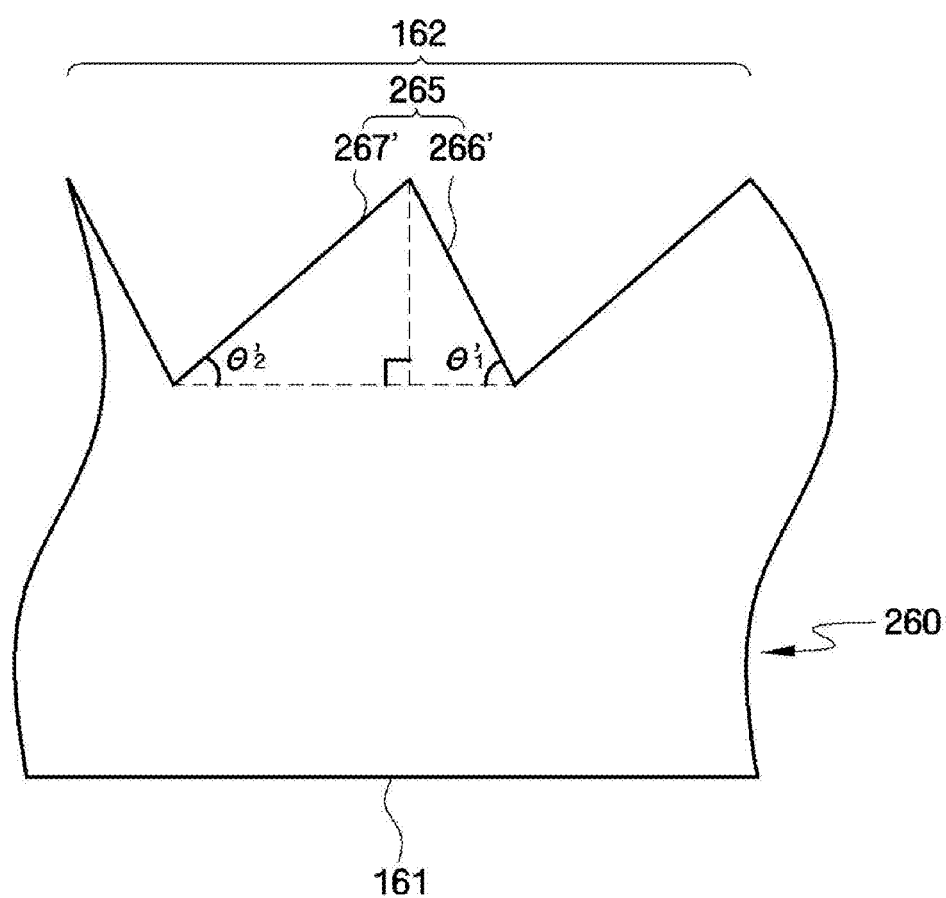

FIG. 8B is a cross-sectional view of an exemplary embodiment of one of the second lens patterns 264, and FIG. 8C is a cross-sectional view of an exemplary embodiment of one of the third lens patterns 265. Referring to FIGS. 7, 8B, and 8C, the second lens patterns 264 are composed of a plurality of a prism pattern which tilts toward the first lens patterns 263. A cross-section of one of the prism patterns which form the second lens patterns 264 includes a first side 266 and a second side 267.

The first and second sides 266 and 267 are inclined or sloped at predetermined angles θ1 and θ2, respectively, with respect to a virtual line which connects respective distal ends of the first and second sides 266 and 267 at the base of the second lens pattern 264 and is substantially parallel to the incident surface 161 of the diffusion plate 260. In the illustrated embodiment, the angle θ1 formed by the virtual line and the first side 266 may be greater than the angle θ2 formed by the virtual line and the second side 267. Accordingly, a slope "tan θ1" of the first side 266 may be greater than a slope "tan θ2" of the second side 267. Referring to FIG. 7, the group of the prism patterns which form the second lens patterns 264 tilt toward a neighboring group of the first lens patterns 263.

A cross-section of one of the prism patterns which form the third lens patterns 265 includes a first side 266' and a second side 267'. The first and second sides 266' and 267' are inclined or sloped at predetermined angles θ'1 and θ'2, respectively, with respect to a virtual line which connects respective distal ends of the first and second sides 266' and 267' at the base of the third lens pattern 265 and is substantially parallel to the incident surface 161 of the diffusion plate 260. In the illustrated embodiment, the angle θ'1 formed by the virtual line and the first side 266' may be greater than the angle θ'2 formed by the virtual line and the second side 267'. Accordingly, a slope "tan θ'1" of the first side 266' may be greater than a slope "tan θ2" of the second side 267'. Referring to FIG. 7, the group of the prism patterns which form the third lens patterns 265 tilt toward a neighboring group of the first lens patterns 263. The group of the second lens patterns 264 and the group of the third lens patterns 265 tilt away (e.g., in opposite directions) from each other.

The virtual line connecting respective distal ends of the first lens pattern 263, first and second sides 266 and 267, and first and second sides 266' and 267' define a base of the first lens pattern 263, the second lens pattern 264 and the third lens pattern 265, respectively. Bases of the first lens pattern 263, the second lens pattern 264 and the third lens pattern 265 are disposed substantially coplanar with each other, and the first lens pattern 263, the second lens pattern 264 and the third lens pattern 265 are disposed directly adjacent to each other on the exit surface 162 of the diffusion plate 260.

Prism patterns which form the group of third lens patterns 265 are symmetrical to the prism patterns which form the group of second lens patterns 264 about a boundary between the groups of the second and third lens patterns 264 and 265. Referring to FIG. 7, the group of the prism patterns of the third lens patterns 265 also tilt toward a neighboring group of the first lens patterns 263, which will not be further described in detail.

The diffusion plate 260 of the second embodiment may include substantially the same material as the diffusion plate 160 of the first embodiment, and thus a detailed description of the material of the diffusion plate 260 will be omitted.

Figure 9A:
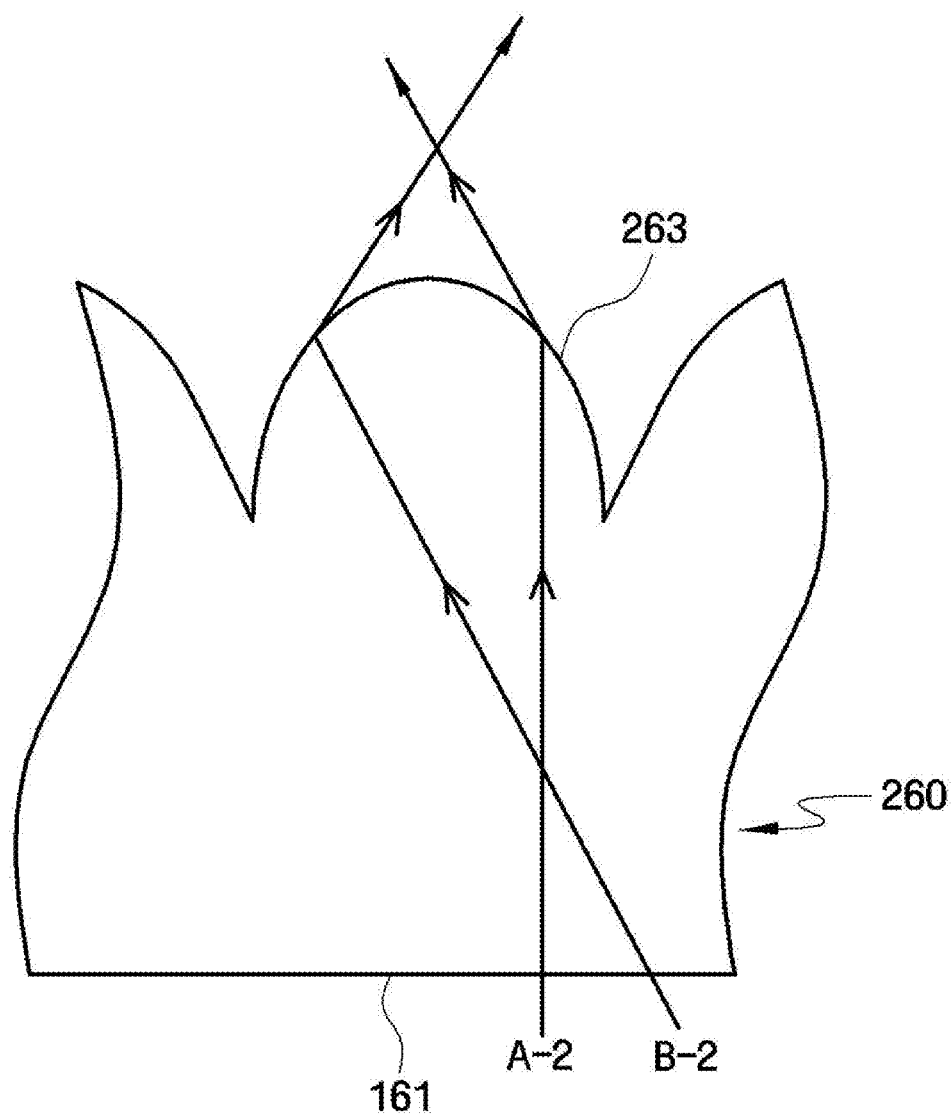
FIGS. 9A and 9B are cross-sectional views showing exemplary embodiments of paths of light incident on an incident surface of each of the first and second lens patterns of the second embodiment, respectively.
Figure 9B:
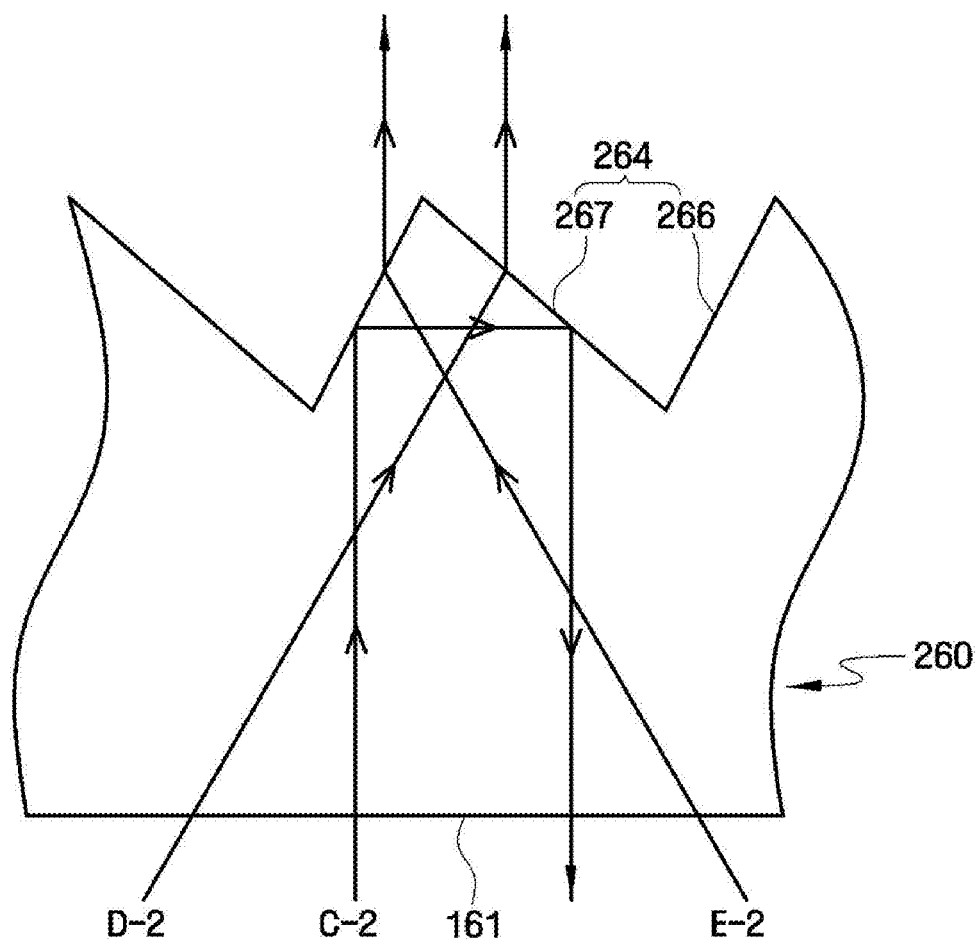

FIGS. 9A and 9B are cross-sectional views showing exemplary embodiments of paths of light incident on portions of the incident surface 161 of each of the first and second lens patterns 263 and 264.

Referring to FIG. 9A, light substantially vertically incident on each of the first lens patterns 263 may travel in a path A-2, and light obliquely incident on each of the first lens patterns 263 may travel in a path B-2. Since each of the first lens patterns 263 is substantially shaped like an end of an oval, paths of light incident on each of the first lens patterns 263 are substantially identical to those of light incident on each of the first and second curved portions 165 and 167 of the first and second lens patterns 163 and 164 illustrated in FIGS. 4A and 4B. Thus, the paths of the light incident on each of the first lens patterns 263 will not be further described.

Referring to FIG. 9B, light substantially vertically incident on the incident surface 161 of each of the second lens patterns 264 may travel in a path C-2. In addition, light obliquely incident on the incident surface 161 of each of the second lens patterns 264 may travel in a path D-2 or E-2.

In the path C-2, when light reaches the first side 266 of each of the second lens patterns 264, it is substantially totally reflected at the first side 266 and directed toward the second side 267. The light is substantially totally reflected at the second side 267 and thus exits through the incident surface 161 of the diffusion plate 260.

In the paths D-2 and E-2, most light passes through the diffusion plate 260. Since a refractive index of the diffusion plate 260 is greater than that of air, light that passed through the first and second sides 266 and 267 is refracted toward above the diffusion plate 260, and exits through the exit surface 162. Accordingly, light, which obliquely enters the first and second sides 266 and 267 of the diffusion plate 260, can be concentrated onto the display panel 21 (see FIG. 1) as it passes through each of the second lens patterns 264.

Since paths of light incident on each of the third lens patterns 265 are substantially identical to those of light incident on each of the second lens patterns 264, a detailed description thereof will be omitted.

The first through third lens patterns 263 through 265 described above substantially uniformly diffuse light, which is emitted from the light sources 70, and concentrates the light on the display panel 21 (see FIG. 1). Advantageously, the luminance uniformity of the display device is enhanced.

Hereinafter, a backlight assembly according to a third exemplary embodiment of the present invention will be described in detail with reference to FIGS. 1 and 10 through 12B. For simplicity, elements having the same functions as those illustrated in the drawings for the first embodiment are indicated by like reference numerals, and thus their description will be omitted.

Figure 10:
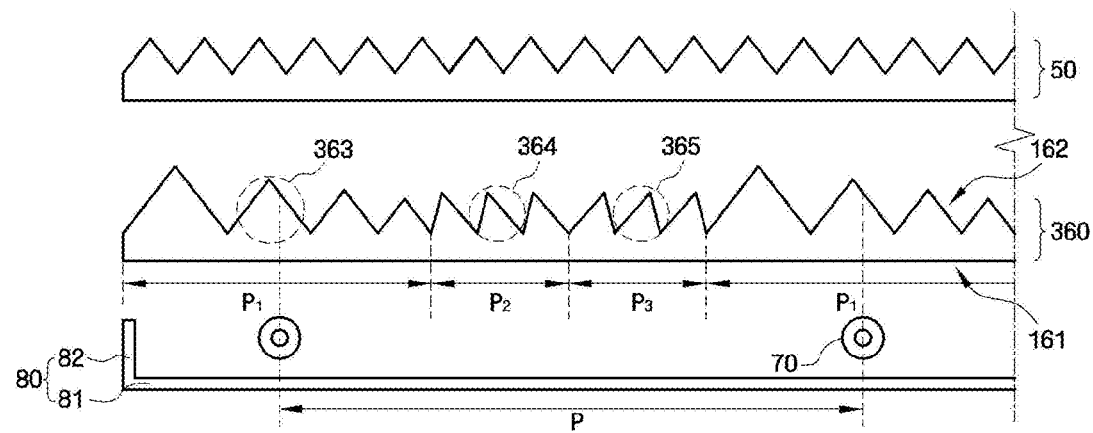
FIG. 10 is a schematic cross-sectional view of a third exemplary embodiment of a backlight assembly included in the display device of FIG. 1.

FIG. 10 is a schematic cross-sectional view of the backlight assembly, which is included in the display device 1 of FIG. 1.

Referring to FIG. 10, the backlight assembly includes a diffusion plate 360 and an optical sheet 50. The diffusion plate 360 includes an incident surface 161 upon which light emitted from a plurality of light sources 70 is incident, an exit surface 162 which is opposite the incident surface 161 with respect to a body of the diffusion plate 360 and from which light exits, and first through third lens patterns 363 through 365 of which groups thereof are sequentially repeated on the exit surface 162. In addition, the optical sheet 50 includes a plurality of a prism pattern disposed on a top surface thereof and overlaps the diffusion plate 360 in the layout view of the display device 1.

The first lens patterns 363 overlap the light sources 70. The first through third lens patterns 363 through 365 are alternately arranged on the exit surface 162 of the diffusion plate 360. The first through third lens patterns 363 through 365 are disposed in first to third sections having predetermined widths, respectively. As a width of each section in which the second or third lens patterns 364 or 365 are disposed may be smaller than a width of each section in which the first lens patterns 363 are disposed. A first section of the diffusion plate 360 may include a first plurality or a first group of the first lens pattern 363, a second section of the diffusion plate 360 may include a second plurality or a second group of the second lens pattern 364, and a third section of the diffusion plate 360 may include a third plurality or a third group of the third lens pattern 365. The first, second and third groups of respective lens patterns are alternated with each other along the transverse direction of the diffusion plate 360.

In the illustrated embodiment, when a pitch (e.g., distance) between every two neighboring ones of the light sources 70 is "P," a width $P_1$ of each section in which the first lens patterns 363 are disposed may be P/2. In addition, a width $P_2$ or $P_3$ taken in the transverse direction of each section in which the second or third lens patterns 364 or 365 are disposed may be P/4. However, the widths $P_1$ through $P_3$ of the sections, in which the first through third lens patterns 363 through 365 are disposed, respectively, are not limited to the above example. Alternatively, the first through third lens patterns 363 through 365 can be disposed in sections having various combinations of widths.

Figure 11A:
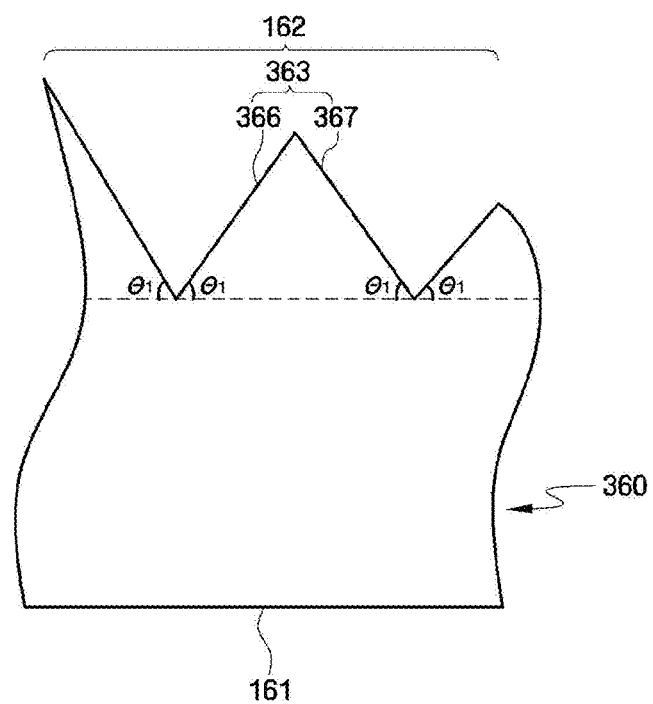
FIGS. 11A through 11C are cross-sectional views of exemplary embodiments of first through third lens patterns of the third embodiment, respectively.

FIG. 11A is a cross-sectional view of an exemplary embodiment of one of the first lens patterns 363. Referring to FIGS. 10 and 11A, the first lens patterns 363 include of a plurality of a prism pattern. A cross-section of each of the prism patterns of the first lens patterns 363 includes a first side 366 and a second side 367. The first and second sides 366 and 367 are inclined or sloped at a predetermined angle θ1 with respect to a virtual line which connects respective distal ends of the first and second sides 366 and 367 at the base of the first lens pattern 363 and is substantially parallel to the incident surface 161 of the diffusion plate 360. In the illustrated embodiment, the angle θ1 formed by the virtual line and the first side 366 is substantially equal to the angle θ1 formed by the virtual line and the second side 367. Accordingly, the cross-section of each of the prism patterns that form the first lens patterns 363 is shaped like a virtual isosceles triangle.

As shown in FIGS. 10 and 11A, the prism patterns of the first lens patterns 363 in each section are gradually reduced in size, such as reduced in cross-sectional area, overall height and/or length of the base. Each one of the prism patterns of the first lens patterns 363 in each section P1 and another adjacent prism pattern of the first lens patterns 363 within the same section P1, have substantially the same shape, i.e., an isosceles triangle, but have different sizes. A size of the prism patterns consecutively disposed within a section P1 in the transverse direction may decrease, such that each of a first prism pattern in section P1 is larger than a second prism pattern adjacent to the first prism pattern at a right side of he first prism pattern.

The shapes of the second and third lens patterns 364 and 365 of the third embodiment are substantially identical to those of the second and third lens patterns 264 and 265 of the second embodiment.

Figure 11B:
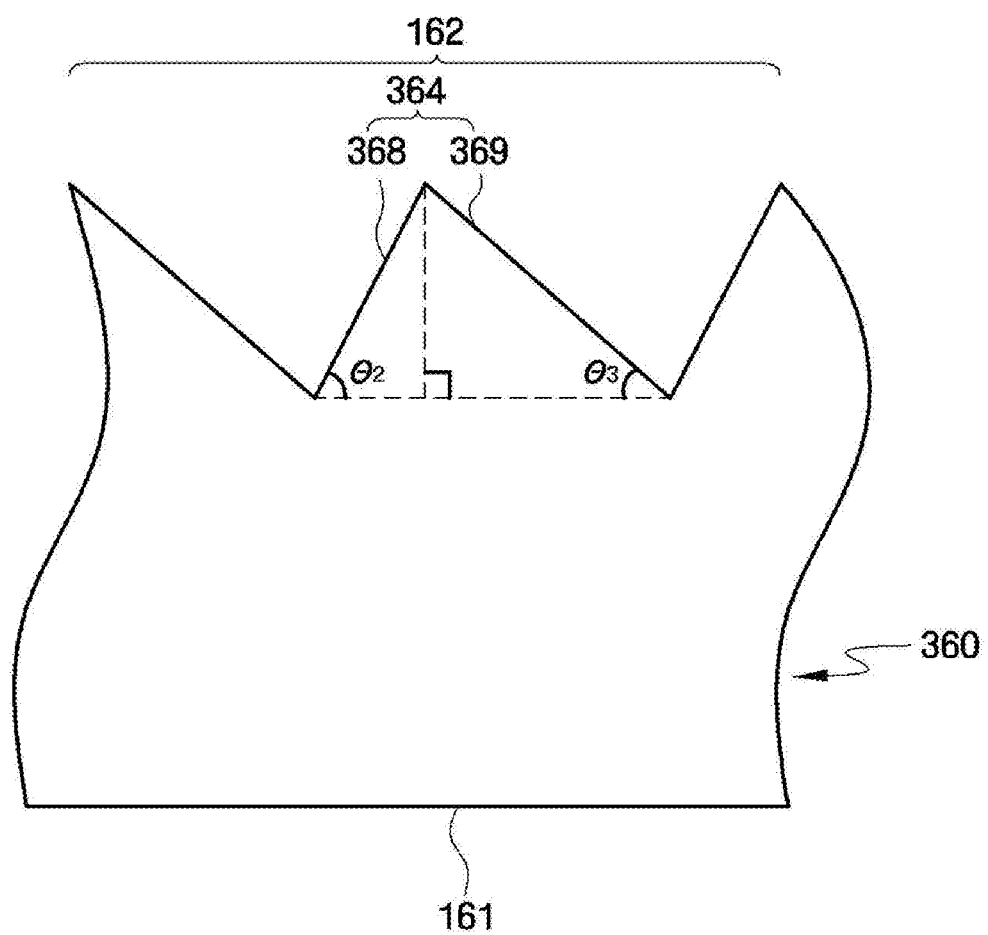
Figure 11C:
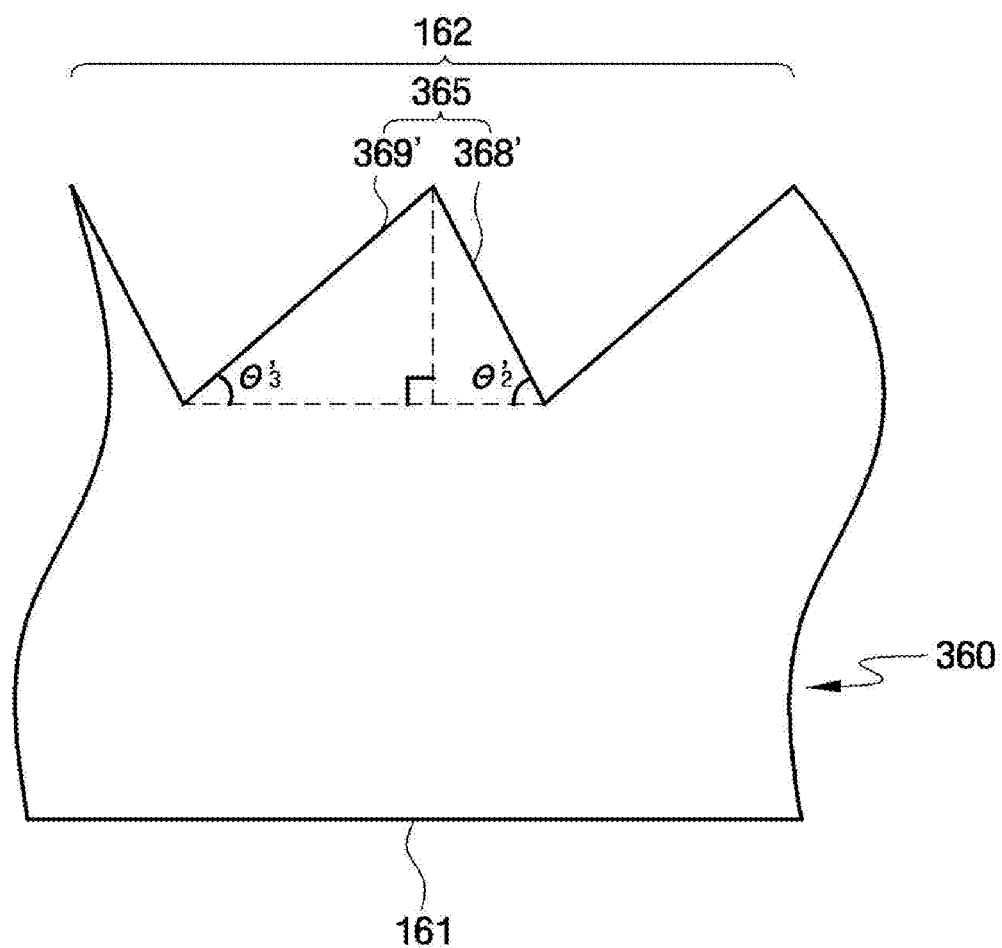

FIG. 11B is a cross-sectional view of an exemplary embodiment of one of the second lens patterns 364, and FIG. 8C is a cross-sectional view of an exemplary embodiment of one of the third lens patterns 365. Referring to FIGS. 10, 11B and 11C, the second lens patterns 364 are composed of a plurality of a prism pattern which tilts toward the first lens patterns 363. A cross-section of one of the prism patterns which form the second lens patterns 364 includes a first side 368 and 369.

The first and second sides 368 and 369 are inclined or sloped at predetermined angles θ2 and θ3, respectively, with respect to a virtual line which connects respective distal ends of the first and second sides 368 and 369 at the base of the second lens pattern 364 and is substantially parallel to the incident surface 161 of the diffusion plate 360. In the illustrated embodiment, the angle θ2 formed by the virtual line and the first side 368 may be greater than the angle θ3 formed by the virtual line and the second side 369. Accordingly, a slope "tan θ2" of the first side 368 may be greater than a slope "tan θ3" of the second side 369. Referring to FIG. 10, the group of the prism patterns which form the second lens patterns 364 tilt toward a neighboring group of the first lens patterns 363.

A cross-section of one of the prism patterns which form the third lens patterns 365 includes a first side 368' and a second side 369'. The first and second sides 368' and 369' are inclined or sloped at predetermined angles θ'2 and θ'3, respectively, with respect to a virtual line which connects respective distal ends of the first and second sides 368' and 369' at the base of the third lens pattern 365 and is substantially parallel to the incident surface 161 of the diffusion plate 360. In the illustrated embodiment, the angle θ'2 formed by the virtual line and the first side 368' may be greater than the angle θ'3 formed by the virtual line and the second side 369'. Accordingly, a slope "tan θ'2" of the first side 368' may be greater than a slope "tan θ3" of the second side 369'. Referring to FIG. 10, the group of the prism patterns which form the third lens patterns 365 tilt toward a neighboring group of the first lens patterns 363. The group of the second lens patterns 364 and the group of the third lens patterns 365 tilt away (e.g., in opposite directions) from each other.

The virtual line connecting respective distal ends of the first and second sides 366 and 367, first and second sides 368 and 369, and first and second sides 368' and 369' define a base of the first lens pattern 363, the second lens pattern 364 and the third lens pattern 365, respectively. Bases of the first lens pattern 363, the second lens pattern 364 and the third lens pattern 365 are disposed substantially coplanar with each other, and the first lens pattern 363, the second lens pattern 364 and the third lens pattern 365 are disposed directly adjacent to each other on the exit surface 162 of the diffusion plate 360.

In addition, the diffusion plate 360 of the third embodiment may include substantially the same material as the diffusion plate 160 of the first embodiment, and thus a detailed description of the material of the diffusion plate 360 will be omitted.

Figure 12A:
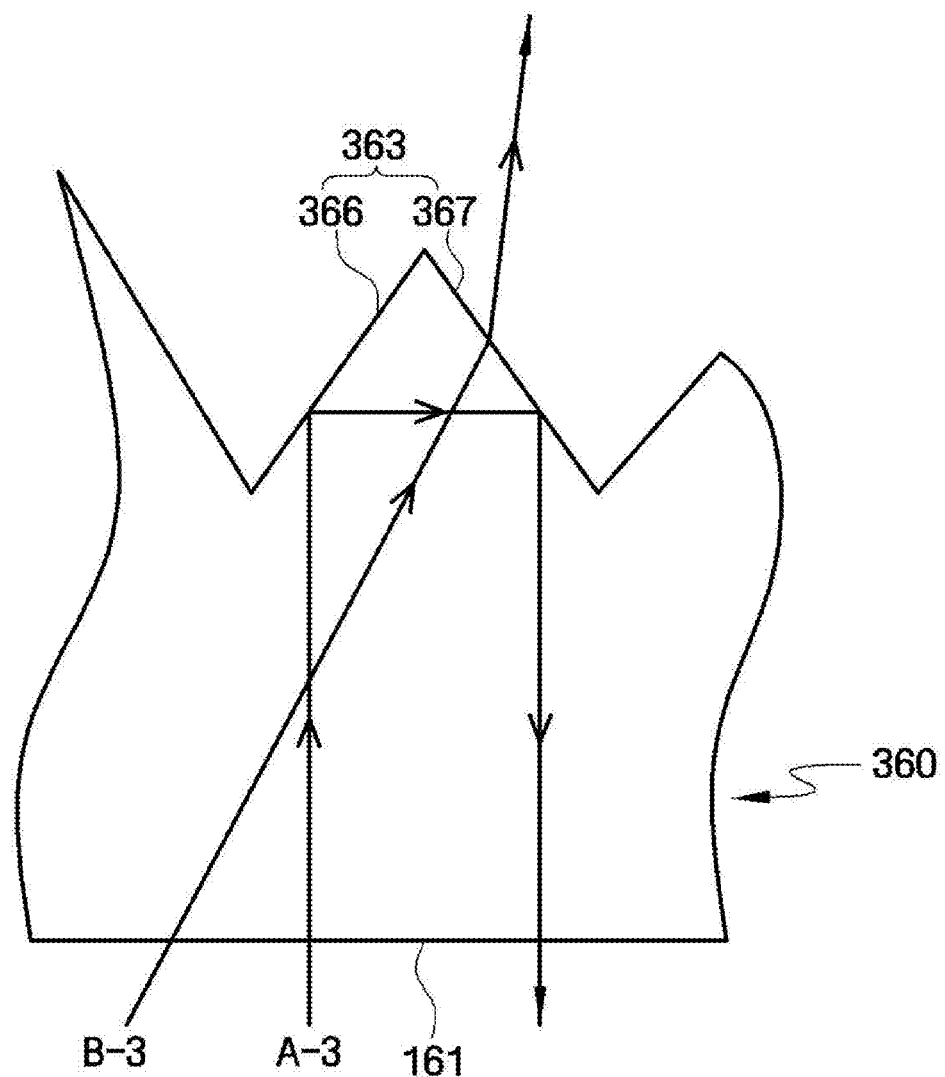
FIGS. 12A and 12B are cross-sectional views showing exemplary embodiments of paths of light incident on an incident surface of each of the first and second lens patterns of the third embodiment.
Figure 12B:
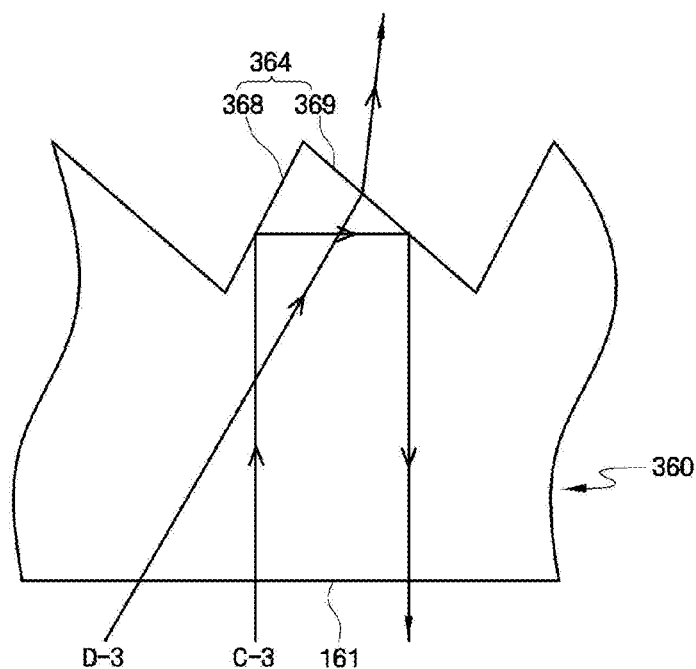

FIGS. 12A and 12B are cross-sectional views showing exemplary embodiments of paths of light incident on portions of the incident surface 161 of each of the first through third lens patterns 363 and 365.

Referring to FIG. 12A, light substantially vertically incident on each of the first lens patterns 363 may travel in a path A-3. In addition, light obliquely incident on each of the first lens patterns 363 may travel in a path B-3.

In the path A-3, when light reaches the first side 366 of each of the first lens patterns 363, it is substantially totally reflected at the first side 366 and directed toward the second side 367. The light is totally reflected at the second side 367 and thus exits through the incident surface 161 of the diffusion plate 360.

In the path B-3, most light passes through the diffusion plate 360. Since a refractive index of the diffusion plate 360 is greater than that of air, light that passed through the first and second sides 366 and 367 is refracted toward above the diffusion plate 360. Accordingly, light, which obliquely enters the first and second sides 366 and 367 of the diffusion plate 360, can be concentrated onto the display panel 21 (see FIG. 1) as it passes through each of the first lens patterns 363.

Since paths of light incident on each of the second and third lens patterns 364 and 365 are substantially identical to those of light incident on each of the second and third lens patterns 264 and 265 of the second embodiment, a detailed description thereof will be omitted.

The first through third lens patterns 363 through 365 described above substantially uniformly diffuse light, which is emitted from the light sources 70, and concentrates the light on the display panel 21 (see FIG. 1). Advantageously, the luminance uniformity of the display device is enhanced.

Hereinafter, a backlight assembly according to a fourth exemplary embodiment of the present invention will be described in detail with reference to FIGS. 1 and 13 through 16. For simplicity, elements having the same functions as those illustrated in the drawings for the first embodiment are indicated by like reference numerals, and thus their description will be omitted.

Figure 13:
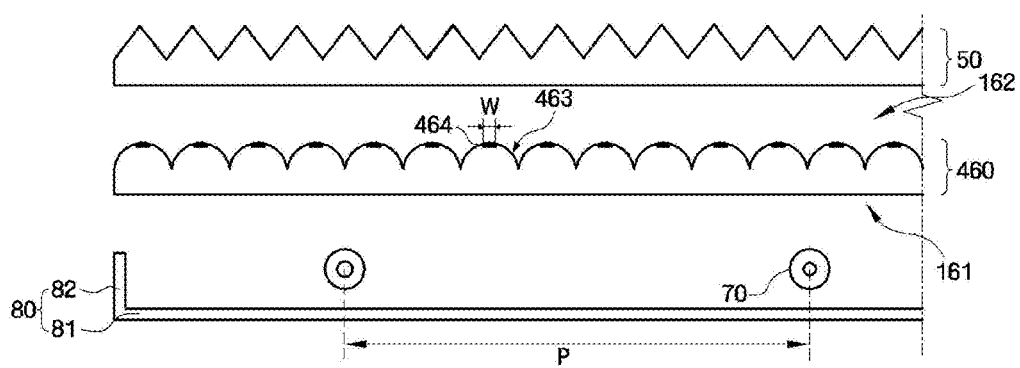
FIG. 13 is a schematic cross-sectional view of a fourth exemplary embodiment of a backlight assembly included in the display device of FIG. 1.
Figure 14:
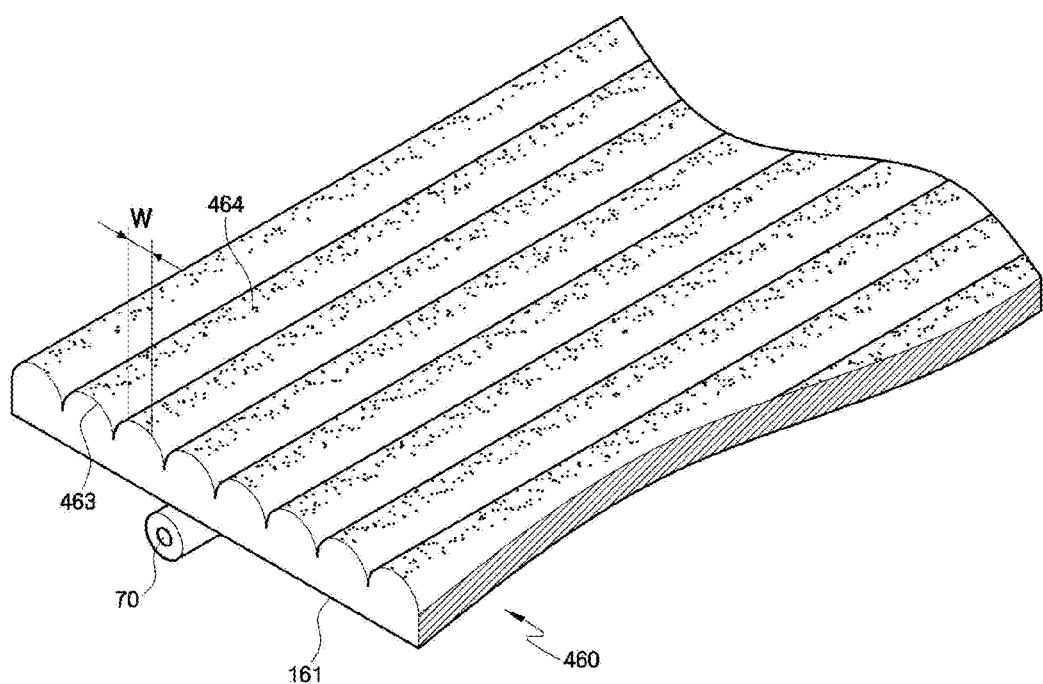
FIG. 14 is a perspective view of a portion of a diffusion plate included in the fourth embodiment shown in FIG. 13.

FIG. 13 is a schematic cross-sectional view of the backlight assembly, which is included in the display device 1 of FIG. 1. FIG. 14 is a perspective view of a portion of a diffusion plate 460 included in the fourth embodiment of the present invention.

Referring to FIGS. 13 and 14, the backlight assembly includes a plurality of a light source 70 which emits light, the diffusion plate 460, and an optical sheet 50. The diffusion plate 460 includes an incident surface 161 upon which light is incident, an exit surface 162 which is opposite the incident surface 161 with respect to a body of the diffusion plate 460 and from which light exits, and a plurality of a lens pattern 463 each of which includes curved portions disposed on the exit surface 162. In addition, the optical sheet 50 includes a plurality of a prism pattern disposed on a top surface thereof and overlaps the diffusion plate 460 in the layout view of the display device.

The diffusion plate 460 of the fourth embodiment may include substantially the same material as the diffusion plate 160 of the first embodiment, and thus a detailed description of the material of the diffusion plate 460 will be omitted.

Figure 15A:
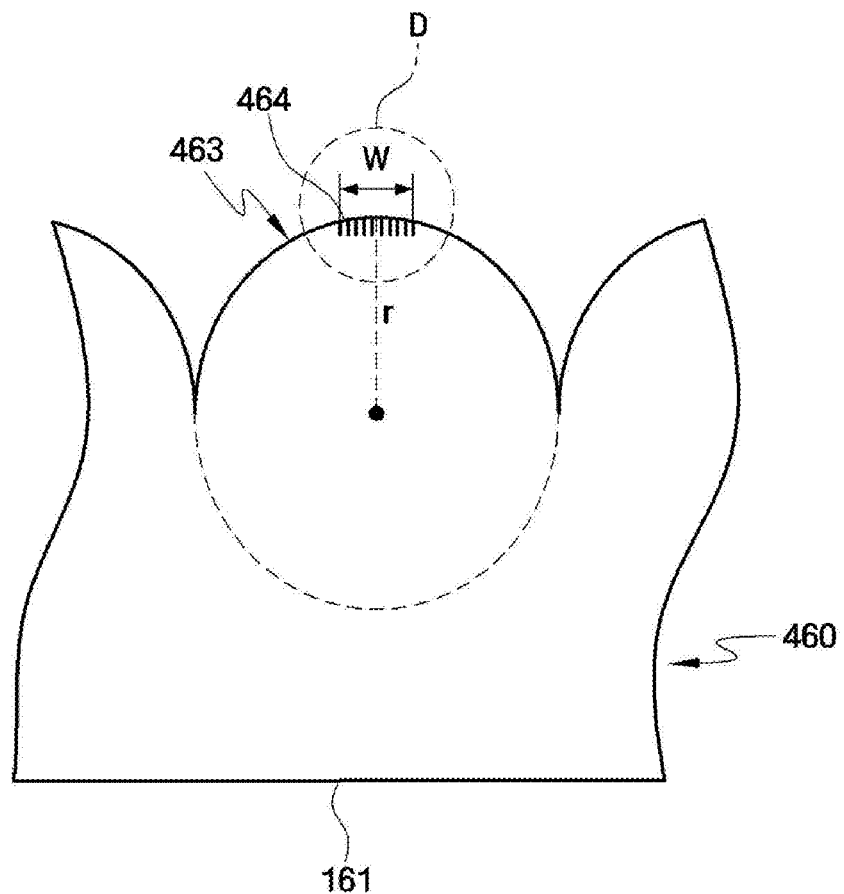
FIGS. 15A and 15B are a cross-sectional view and an enlarged view of an exemplary embodiment of a lens pattern included in the fourth embodiment shown in FIG. 13, respectively.
Figure 15B:
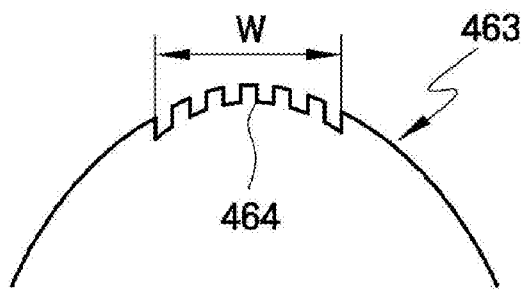

Referring to FIGS. 13, 15A and 15B, each of the lens patterns 463 include a curved portion. A cross-section of each of the lens patterns 463 may be shaped like an end of a circle having a radius of "r." The cross-section of each of the lens patterns 463 is shaped like an end of a circle to effectively diffuse light which is incident on the diffusion plate 460. The lens patterns 463 may longitudinally extend in a lengthwise (first) direction of the light sources 70 and substantially parallel to the lengthwise direction of the light sources 70. The lens patterns 463 are arranged in a transverse (second) direction of the light sources 70, and are disposed directly adjacent to each other across the exit surface 162 of the diffusion plate 460.

Light diffusion patterns 464 are disposed in a region "W" of an upper (e.g., distal) end of each of the lens patterns 463. The light diffusion patterns 464 diffuse light which is incident on the diffusion plate 460. The light diffusion patterns 464 include uneven portions. In one exemplary embodiment, the uneven portions may be formed by radiating a laser beam onto the upper end of each of the lens patterns 463, in the form of pulses and thus cutting a surface of the upper end.

Referring to FIGS. 14, 15A and 15B, each of the light diffusion patterns 464 includes a plurality of an irregular uneven portion disposed in the upper end of each of the lens patterns 463 disposed extended along a lengthwise direction of the lens patterns 463. FIG. 14 shows the light diffusion patterns 464 being non-uniformly disposed along a lens pattern 463, both in the longitudinal direction and in the transverse direction of the diffusion plate 460. The region "W" of the upper end of each of the lens patterns 463 may have a width in the transverse direction of about 30 µm to about 50 µm. Each of the irregular uneven portions collectively defining a light diffusion pattern 464 may extend from an outer surface of the distal end of the lens pattern 463 toward an inner area of the lens pattern 463.

Figure 16:
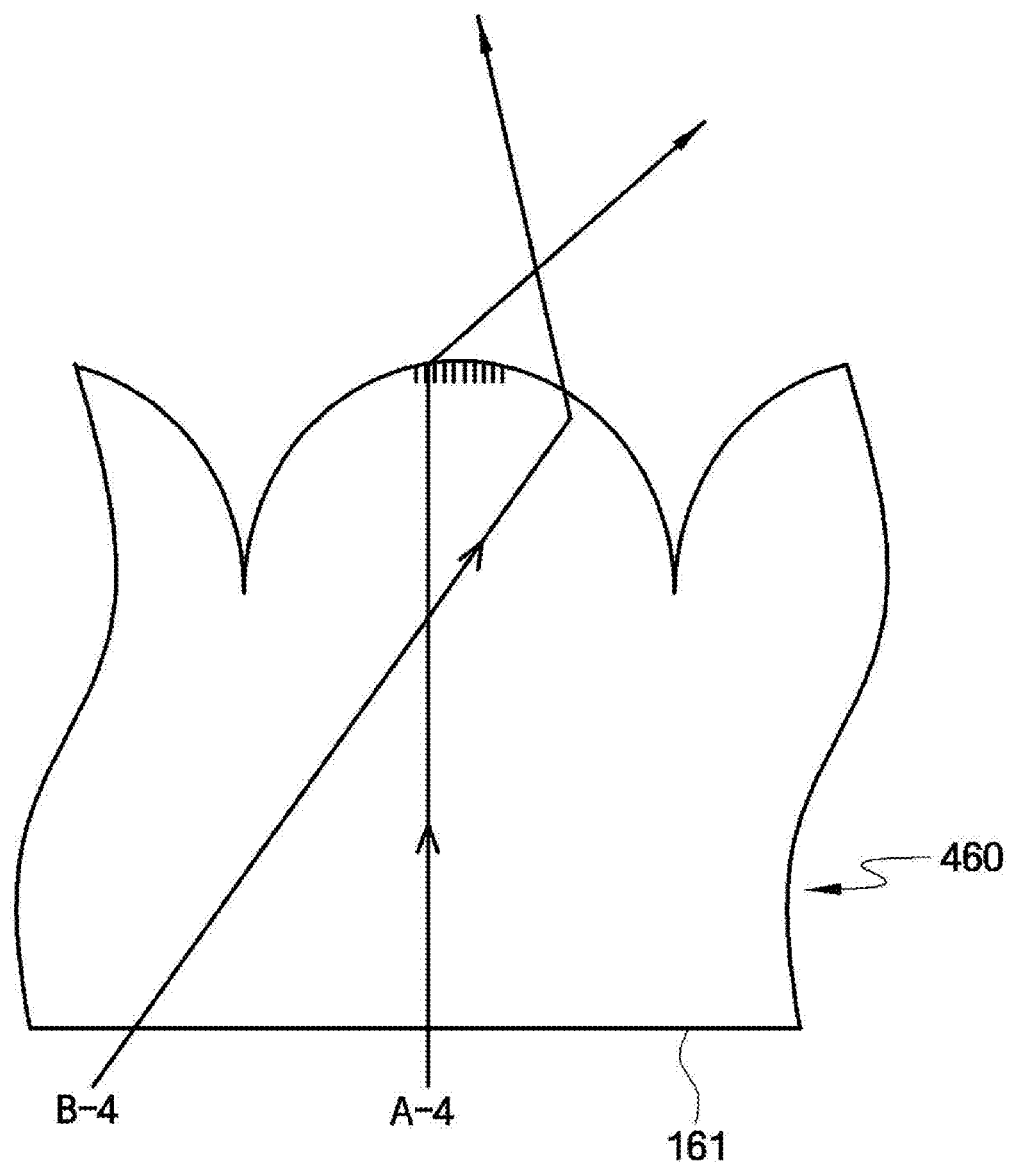
FIG. 16 is a cross-sectional view showing an exemplary embodiment of paths of light incident on an incident surface of the lens pattern of the fourth embodiment.

FIG. 16 is a cross-sectional view showing an exemplary embodiment of paths of light incident on portions of the incident surface 161 of each of the lens patterns 463. Referring to FIG. 16, light substantially vertically incident on each of the lens patterns 463 may travel in a path A-4. In addition, light obliquely incident on each of the lens patterns 463 may travel in a path B-4.

In the path A-4, light is substantially vertically incident on the incident surface 161 and passes through the light diffusion patterns 464 of the upper end of each of the lens patterns 463. The light is refracted as it passes through the light diffusion patterns 464.

Unlike in the fourth embodiment of the present invention, if the light diffusion patterns 464 are not disposed in each of the lens patterns 463, light vertically incident on the incident surface 161 may pass through the upper end of each of the lens patterns 463 without being refracted. If a normal, which is perpendicular to a tangent plane to each of the lens patterns 463, is a path of light, a tangent plane to the upper end of each of the lens patterns 463 may be substantially parallel to the incident surface 161. Accordingly, a normal, which is perpendicular to the tangent plane to the upper end of each of the lens patterns 463, may also be perpendicular to the incident surface 161. Where the light diffusion patterns 464 are not disposed in each of the lens patterns 463, of light that vertically enters the incident surface 161, light that passes through the upper end of each of the lens patterns 463 may not be refracted. If the light diffusion patterns 464 are not disposed in the upper end of each of the lens patterns 463, the luminance uniformity of the display device may be undesirably undermined.

However, if the light diffusion patterns 464 are disposed in the upper end of each of the lens patterns 463 as illustrated and described in the fourth embodiment, the overall luminance uniformity of the display device can be advantageously enhanced.

In the path B-4, light is obliquely incident on each of the lens patterns 463. Light is obliquely incident on each of the lens patterns 463 and is refracted as it passes through each of the lens patterns 463 due to the difference between a refractive index of air and that of the diffusion plate 460.

As described above, light incident on each of the lens patterns 463 according to the fourth embodiment is refracted as it passes through each of the lens patterns 463. Advantageously, the light emitted from the light sources 70 is diffused and delivered accordingly to the display panel 21 (see FIG. 1), thereby enhancing the overall luminance uniformity of the display device.

Hereinafter, a backlight assembly according to a fifth exemplary embodiment of the present invention will be described in detail with reference to FIGS. 1 and 17 through 20. For simplicity, elements having the same functions as those illustrated in the drawings for the first embodiment are indicated by like reference numerals, and thus their description will be omitted.

Figure 17:
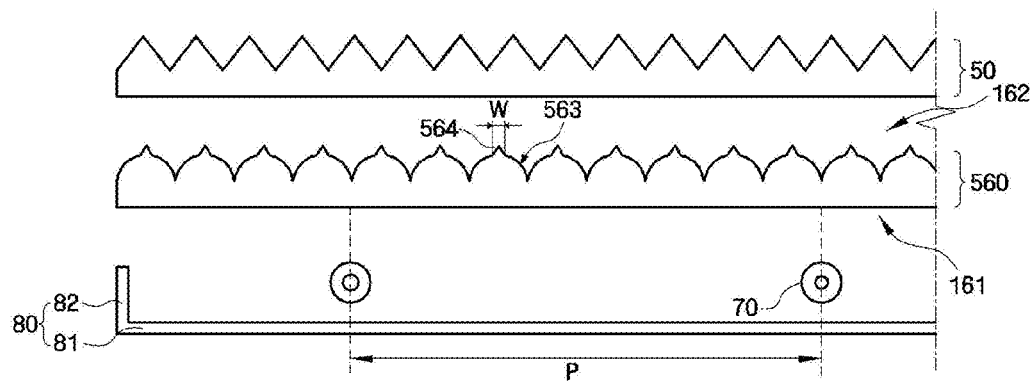
FIG. 17 is a schematic cross-sectional view of a fifth exemplary embodiment a backlight assembly included in the display device of FIG. 1.
Figure 18:
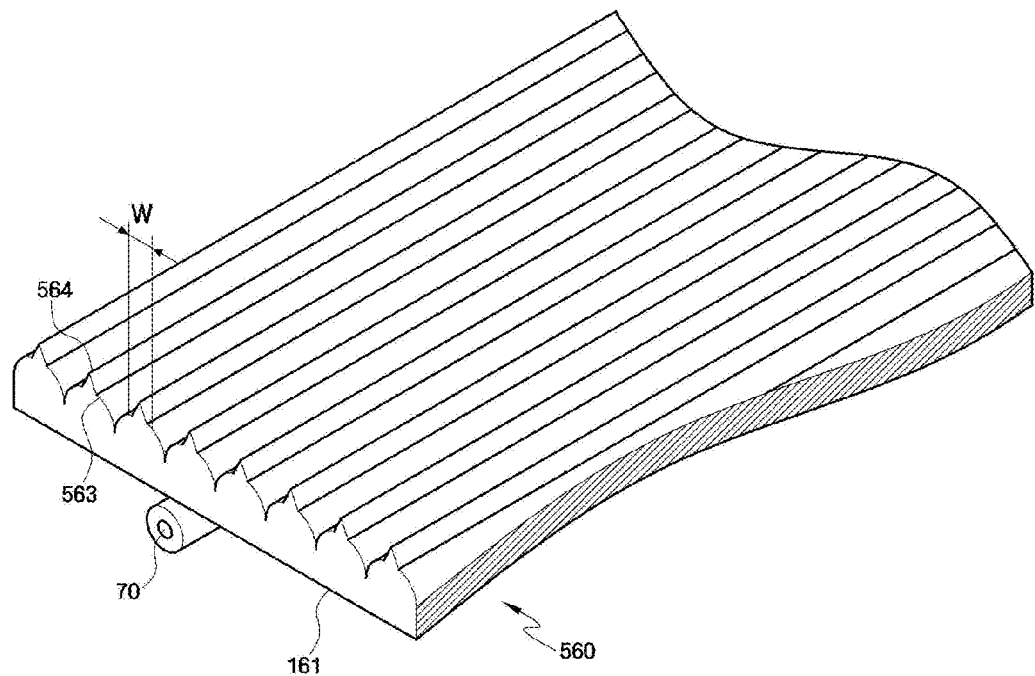
FIG. 18 is a perspective view of an exemplary embodiment of a portion of a diffusion plate of the fifth embodiment shown in FIG. 17.

FIG. 17 is a schematic cross-sectional view of the backlight assembly, which is included in the display device 1 of FIG. 1. FIG. 18 is a perspective view of a portion of a diffusion plate 560 according to the fifth embodiment of the present invention.

Referring to FIGS. 17 and 18, the backlight assembly includes a plurality of light sources 70 which emit light, the diffusion plate 560, and an optical sheet 50. The diffusion plate 560 includes an incident surface 161 upon which light is incident, an exit surface 162 which is opposite the incident surface 161 and from which light exits, and lens patterns 563 which are composed of curved portions disposed on the exit surface 162. In addition, the optical sheet 50 includes a plurality of a prism pattern disposed on a top surface thereof and overlaps the diffusion plate 560.

The diffusion plate 560 of the fifth embodiment may include substantially the same material as the diffusion plate 160 of the first embodiment, and thus a detailed description of the material of the diffusion plate 560 will be omitted.

Figure 19:
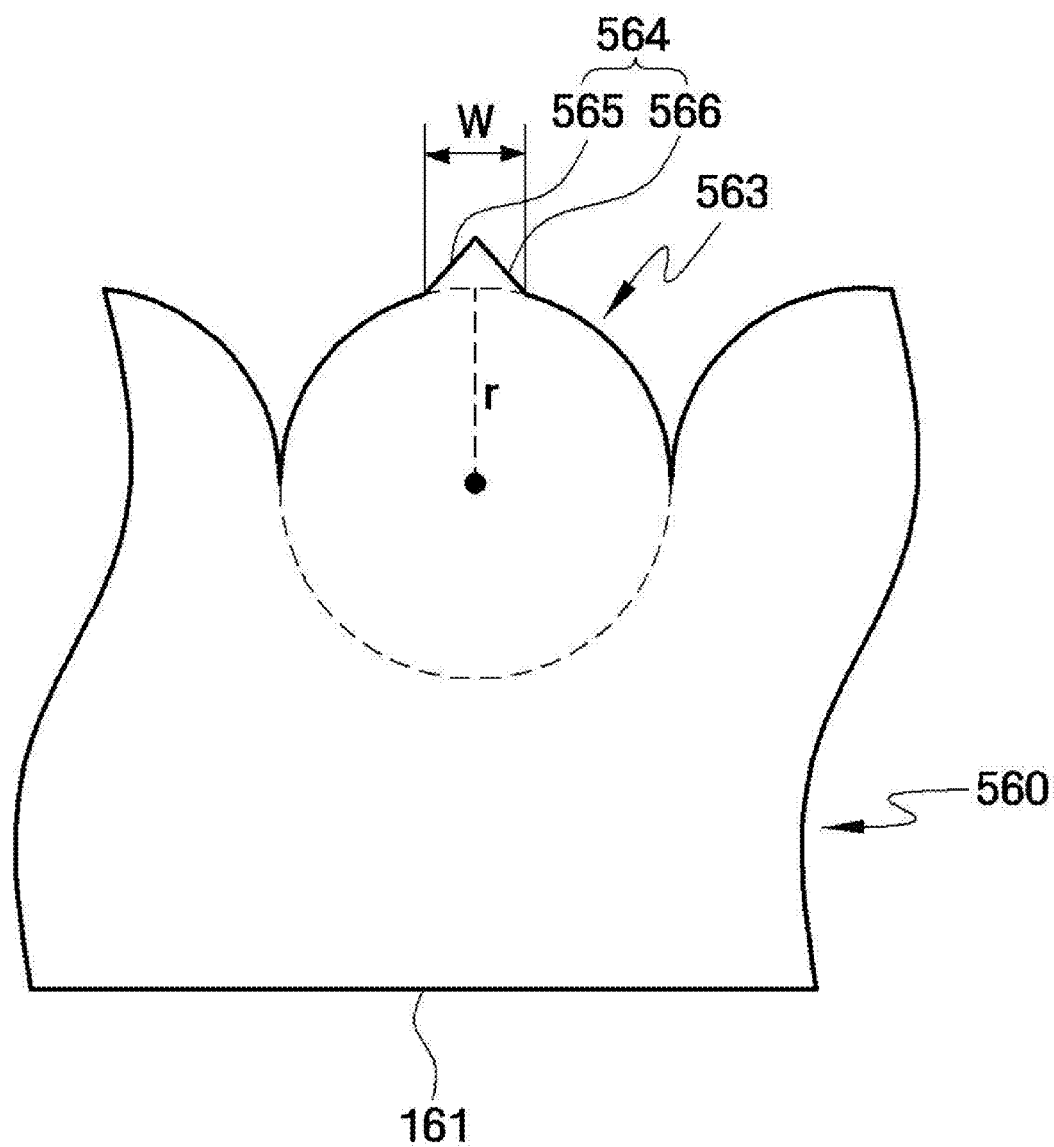
FIG. 19 is a cross-sectional view of an exemplary embodiment of a lens pattern of the fifth embodiment shown in FIG. 17.

Referring to FIGS. 17 through 19, each of a plurality of the lens pattern 563 includes curved portions disposed extending from the exit surface 162 of the diffusion plate 560. A cross-section of each of the lens patterns 563 may be shaped like an end of a virtual circle having a radius of "r," the curved portions being a part of the virtual circle, shown in a dotted line of FIG. 19. The cross-section of each of the lens patterns 563 is shaped like an end of a circle to effectively diffuse light incident on the diffusion plate 560. Each of the lens patterns 563 may longitudinally extend in a lengthwise (first) direction of the light sources 70 and may be substantially parallel to the light sources 70.

Each of the light diffusion patterns 564 is disposed in a region "W" of an upper end of each of the lens patterns 563. The light diffusion pattern 564 is disposed protruding from the virtual circle, so as to define a distal end of the lens pattern 563. The light diffusion pattern 564 diffuses light incident on the diffusion plate 560. In the illustrated embodiment, the light diffusion pattern 564 includes a prism pattern.

Referring to FIG. 18, the prism pattern, i.e., the light diffusion pattern 564, is disposed in the upper end of each of the lens patterns 563, and longitudinally extends along a lengthwise direction of the lens patterns 563. The region "W" of the upper end of each of the lens patterns 563 may have a width of about 30 μm to about 50 μm taken in the transverse direction.

A cross-section of the prism pattern, which is the light diffusion pattern 564, includes a first side 565 and a second side 566. The first and second sides 565 and 566 are disposed at a predetermined angle or slope with respect to a virtual line which connects respective distal ends of the first and second sides 565 and 566 and is parallel to the incident surface 161. The distal ends of the first and second sides 565 and 566 respectively contact a curved surface of the lens pattern 563, such that the light diffusion pattern 564 is disposed continuous with the lens pattern 563. The diffusion plate 560 is a single, continuous and indivisible member, including both the lens pattern 563 and the light diffusion pattern 564. In the illustrated embodiment, the angle formed by the virtual line and the first side 565 is substantially equal to the angle formed by the virtual line and the second side 566. Accordingly, the cross-section of the prism pattern, i.e., the light diffusion pattern 564, is shaped like a virtual isosceles triangle.

Figure 20:
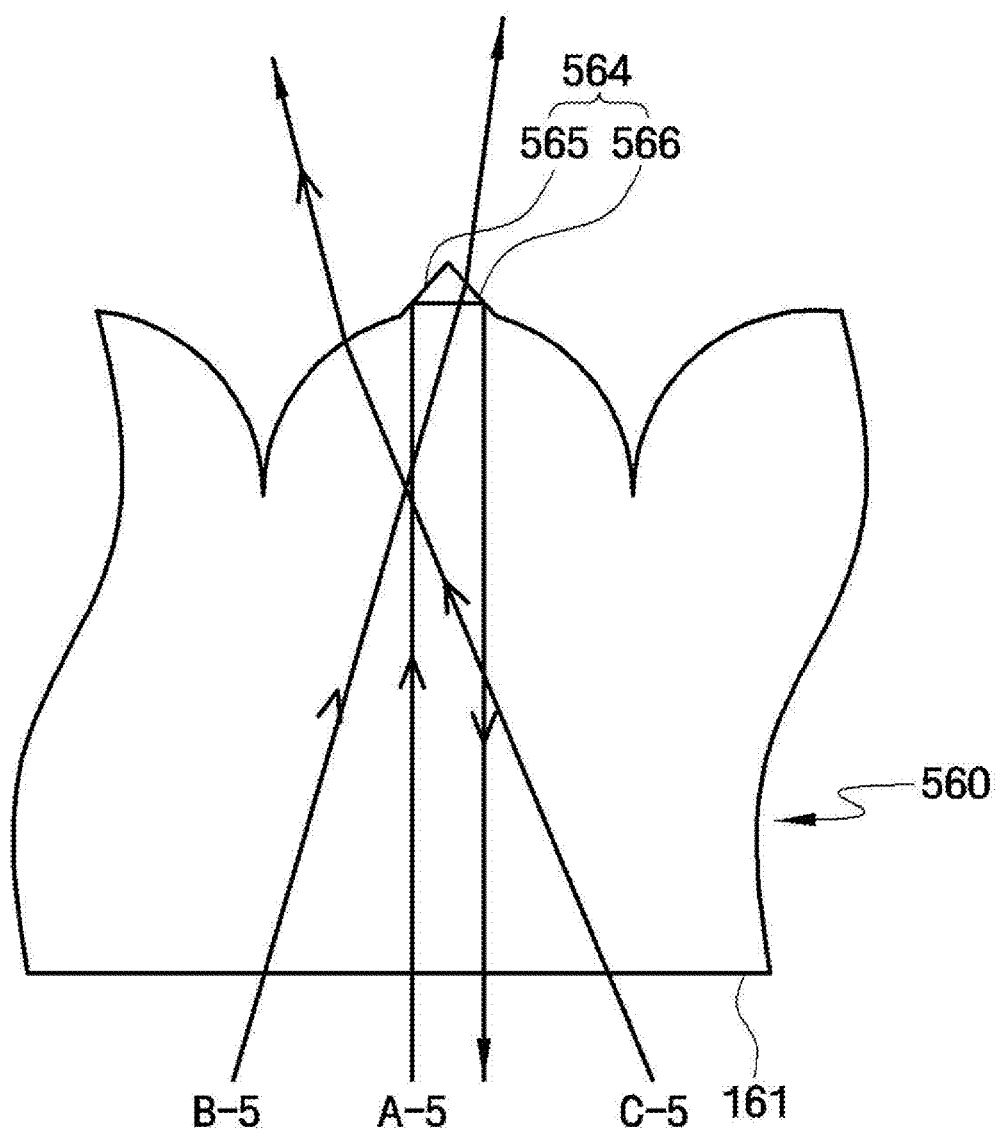
FIG. 20 is a cross-sectional view showing an exemplary embodiment of paths of light incident on an incident surface of the lens pattern of the fifth embodiment shown in FIG. 17.

FIG. 20 is a cross-sectional view showing an exemplary embodiment of paths of light incident on the incident surface 161 of each of the lens patterns 563. Referring to FIG. 20, light substantially vertically incident on each of the lens patterns 563 may travel in a path A-5. In addition, light obliquely incident on each of the lens patterns 563 may travel in a path B-5 or C-5.

In the path A-5, light is substantially vertically incident on the incident surface 161 and reaches the light diffusion pattern 564 of the upper end of each of the lens patterns 563. Light is substantially totally reflected as it reaches the first side 565 of the light diffusion pattern 564 and directed toward the second side 566. The light is substantially totally reflected as it reaches the second side 566 and thus exits through the incident surface 161 of the diffusion plate 560.

Unlike in the fifth embodiment of the present invention, if the light diffusion pattern 564 is not disposed in each of the lens patterns 563, light vertically incident on the incident surface 161 may pass through the upper end of each of the lens patterns 563 without being refracted. If a normal, which is perpendicular to a tangent plane to each of the lens patterns 563, is a path of light, a tangent plane to the upper end of each of the lens patterns 563 may be substantially parallel to the incident surface 161. Accordingly, a normal, which is perpendicular to the tangent plane to the upper end of each of the lens patterns 563, may also be perpendicular to the incident surface 161. Where the light diffusion pattern 564 is not disposed in each of the lens patterns 563, of light that vertically enters the incident surface 161, light that passes through the upper end of each of the lens patterns 563 may not be refracted. For this reason, if the light diffusion pattern 564 is not disposed in the upper end of each of the lens patterns 563, the luminance uniformity of the display device may be undesirably undermined.

However, if the light diffusion pattern 564 is disposed in the upper end of each of the lens patterns 563 as illustrated and described in the fifth embodiment, light, which may have passed through the upper end of each of the lens patterns 563, is substantially totally reflected by the light diffusion pattern 564 of the upper end of each of the lens patterns 563. Accordingly, the light exits through the incident surface 161 of the diffusion plate 560. The light output from the diffusion pate 560 through the incident surface 161 is reflected by the reflective sheet 80 and thus enters the diffusion plate 560 again, and the light passes through each of the lens patterns 563 and is concentrated onto the display panel 21 (see FIG. 1).

When the light output from the incident surface 161 of the diffusion plate 560 enters the diffusion plate 560 again, the path of the light may be changed and the light may not necessarily be vertically incident on the diffusion plate 560. Advantageously, the light coming out of the diffusion plate 560 again through the incident surface 161 can be reduced or effectively prevented.

Referring to FIG. 20, in the paths B-5 and C-5, light is obliquely incident on each of the lens patterns 563. Light is obliquely incident on each of the lens patterns 563 and is refracted as it passes through each of the lens patterns 563 due to the difference between a refractive index of air and that of the diffusion plate 560.

As described above, light incident on each of the lens patterns 563 according to the fifth embodiment is refracted as it passes through each of the lens patterns 563. Advantageously, the light emitted from the light sources 70 is diffused and delivered accordingly to the display panel 21 (see FIG. 1), thereby enhancing the overall luminance uniformity of the display device.

As described above, when any one of the diffusion plates 160 through 560 according to the first through fifth embodiments of the present invention, and the optical sheet 50 are applied to a backlight assembly, the luminance uniformity of the light sources 70 can be greatly increased. Even if a pitch between every two neighboring ones of the light sources 70 is increased to achieve low power consumption, and even if the distance between the light sources 70 and any one of the diffusion plates 160 through 560 is reduced to make the display device slimmer, sufficient luminance uniformity can be secured.

Advantageously, the overall thickness of the display device, which includes any one of the diffusion plates 160 through 560 according to the present invention, the light sources 70, and the display panel 21, can be significantly reduced, and the power consumption thereof can be reduced. In one exemplary embodiment, if the present invention is applied to a 52-inch liquid crystal display ("LCD") television module, the thickness of the 52-inch LCD television module can be reduced to about 20 millimeters (mm) or less. In addition, since a pitch between every two neighboring light sources can be sharply increased to about 28 mm, the number of light sources required can be reduced, which, in turn, reduces the power consumption of the 52-inch LCD television module.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
    a plurality of light sources generating and emitting light; and
    a diffusion plate comprising:
        an incident surface on which the light is incident,
        an exit surface which is opposite the incident surface and from which the light exits, and a group of consecutive first lens patterns each having a first shape, and a group of consecutive second lens patterns each having a second shape different than the first shape, wherein the group of consecutive first lens patterns and the group of consecutive second lens patterns alternate are both on the exit surface,
    the group of consecutive first lens patterns adjacent to the group of consecutive second lens patterns form a pair, and only one of the plurality of light sources overlaps the pair such that each pair has one of the plurality of light sources aligned below the pair, and the first shape or the second shape comprises a curved portion which forms a curve, and a linear portion extending from each of opposing ends of the curved portion, respectively.

2. The backlight assembly of claim 1, wherein
    a width of each section in which the group of consecutive first lens patterns is disposed is substantially equal to a width of each section in which the group of consecutive second lens patterns is disposed, and
    a center of the width of each section in which the group of consecutive first lens patterns are disposed overlaps the only one light source.

3. The backlight assembly of claim 1, wherein
    each of the first lens patterns comprises a first curved portion which forms a curve, and a first linear portion extending from each of opposing ends of the first curved portion, respectively,
    each of the second lens patterns comprises a second curved portion which forms a curve, and a second linear portion extending from each of opposing ends of the second curved portion, respectively, and
    the first and second curved portions are comprised of respective ends of different ovals, respectively.

4. The backlight assembly of claim 3, wherein
    a base angle of a virtual isosceles triangle, which is inscribed in the first curved portion and has two vertexes contacting the first linear portions, respectively, is about 50 degrees to about 52 degrees, and
    a base angle of a virtual isosceles triangle, which is inscribed in the second curved portion and has two vertexes contacting the second linear portions, respectively, is about 42 degrees to about 49 degrees.

5. The backlight assembly of claim 3, wherein the first curved portion and each of the first linear portions have heights of H1 and H2, respectively, and $0.12*H1 < H2 < 1.25*H1$, the heights H1 and H2 taken substantially perpendicular to the incident surface of the diffusion plate.

6. The backlight assembly of claim 3, wherein when the second curved portion and each of the second linear portions have heights of H3 and H4, respectively, and $0.9*H3 < H4 < 1.1*H3$, the heights H3 and H4 taken substantially perpendicular to the incident surface of the diffusion plate.

7. The backlight assembly of claim 3, wherein a ratio of a length of a long axis of a respective oval forming the first curved portion, to a length of a short axis of the respective oval is about 2.4 to about 3.5.

8. The backlight assembly of claim 7, wherein a difference between the ratio of the length of the long axis of a first oval, an end of which forms the first curved portion, to the length of the short axis of the first oval, and the ratio of the length of the long axis of a second oval, an end of which forms the second curved portion, to the length of the short axis of the second oval, is about 0.01 to about 0.3.

9. The backlight assembly of claim 3, wherein a ratio of a slope of each of the first linear portions to a slope of each of the second linear portions is about 1 to about 1.5.

10. The backlight assembly of claim 1, wherein when a distance between the light sources and the diffusion plate is D, and when a pitch between every two neighboring ones of the light sources is P, 0.3<D/(P/2)<0.5, the distance D taken substantially perpendicular to the incident surface of the diffusion plate and the pitch P taken substantially perpendicular to a longitudinal direction of the diffusion plate.

11. The backlight assembly of claim 1, further comprising an optical sheet which overlaps the diffusion plate and comprises prism patterns on a top surface thereof.

12. A display device comprising: a plurality of light sources generating and emitting light;
 a display panel receiving the light from the light sources and displaying image information; and
 a diffusion plate comprising an incident surface on which the light is incident, an exit surface which is opposite the incident surface and from which the light exits, a group of consecutive first lens patterns each having a first shape and a group of consecutive second lens
patterns each having a second shape different than the first shape, wherein
the group of consecutive first lens patterns and the group of consecutive second lens patterns alternate are on the exit surface,
the group of consecutive first lens patterns adjacent to the group of consecutive second lens patterns form a pair, and only one of the plurality of light sources overlaps the pair such that each pair has one of the plurality of light sources aligned below the pair, and wherein the first shape or the second shape comprises a curved portion which forms a curve, and a linear portion extending from each of opposing ends of the curved portion, respectively.

* * * * *